United States Patent
Ye et al.

(10) Patent No.: US 12,510,923 B2
(45) Date of Patent: Dec. 30, 2025

(54) CLOCK SYNCHRONIZATION METHOD AND APPARATUS, ELECTRONIC DEVICE AND STORAGE MEDIUM

(71) Applicants: Beijing Youzhuju Network Technology Co., Ltd., Beijing (CN); Lemon Inc., Grand Cayman (KY)

(72) Inventors: Jincai Ye, Beijing (CN); Yuanlin Cheng, Beijing (CN); Shan Lu, Los Angeles, CA (US); Jian Wang, Beijing (CN)

(73) Assignees: Beijing Youzhuju Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 26 days.

(21) Appl. No.: 18/513,433

(22) Filed: Nov. 17, 2023

(65) Prior Publication Data

US 2024/0168516 A1 May 23, 2024

(30) Foreign Application Priority Data

Nov. 18, 2022 (CN) .......................... 202211445758.7

(51) Int. Cl.
G06F 1/12 (2006.01)
(52) U.S. Cl.
CPC ...................................... *G06F 1/12* (2013.01)
(58) Field of Classification Search
CPC ............. G06F 1/12; G06F 1/08; H04J 3/0685
See application file for complete search history.

(56) References Cited

U.S. PATENT DOCUMENTS

| | | | | |
|---|---|---|---|---|
| 5,295,257 | A * | 3/1994 | Berkovich | G06F 1/12 713/400 |
| 7,966,439 | B1 * | 6/2011 | Treichler | G06F 13/1689 710/6 |
| 8,879,681 | B2 * | 11/2014 | Dally | H04L 7/0012 375/364 |
| 9,058,135 | B1 * | 6/2015 | Schumacher | G06F 1/10 |
| 11,366,488 | B1 * | 6/2022 | Arora | G06F 1/3237 |

(Continued)

FOREIGN PATENT DOCUMENTS

| | | |
|---|---|---|
| CN | 102265237 A | 11/2011 |
| CN | 103365336 A | 10/2013 |

(Continued)

*Primary Examiner* — Faisal M Zaman
(74) *Attorney, Agent, or Firm* — BakerHostetler

(57) ABSTRACT

A clock synchronization method and apparatus, an electronic device and a storage medium are provided. The clock synchronization method includes: sending a trigger signal to a second processing module and recording a current count value of the first timer upon sending the trigger signal as a first count value; and reading a second count value from the second processing module, the second count value is a current count value of a second timer of the second processing module upon the second processing module receiving the trigger signal, and a count value of the second timer is used as a timing reference of the second processing module and sequentially increasing; the first count value and the second count value are used for a clock compensation to synchronize a first clock domain where the first processing module is located with a second clock domain where the second processing module is located.

17 Claims, 9 Drawing Sheets

(56) References Cited

U.S. PATENT DOCUMENTS

| | | | | |
|---|---|---|---|---|
| 2003/0156622 | A1* | 8/2003 | Gold | G01K 7/01 374/170 |
| 2003/0235216 | A1* | 12/2003 | Gustin | H04J 3/0697 370/503 |
| 2004/0000939 | A1* | 1/2004 | Meguro | G06F 1/08 327/160 |
| 2007/0139085 | A1* | 6/2007 | Elliot | G06F 5/06 327/100 |
| 2008/0126825 | A1* | 5/2008 | Yang | H04J 3/0664 713/600 |
| 2009/0141571 | A1* | 6/2009 | Johnson | G11C 7/22 365/194 |
| 2012/0005517 | A1 | 1/2012 | Foster et al. | |
| 2017/0269631 | A1* | 9/2017 | Bauknecht | G05B 9/02 |
| 2018/0115409 | A1* | 4/2018 | Nayyar | G01S 13/343 |
| 2018/0138899 | A1* | 5/2018 | Tee | H03L 7/0992 |
| 2021/0083666 | A1* | 3/2021 | Matalon | H03K 5/135 |
| 2022/0239459 | A1* | 7/2022 | Onde | H04J 3/0697 |
| 2023/0104174 | A1* | 4/2023 | Ahn | G06F 3/011 713/400 |
| 2023/0140495 | A1* | 5/2023 | Gu | G11C 7/222 327/156 |

FOREIGN PATENT DOCUMENTS

| | | |
|---|---|---|
| CN | 107040327 A | 8/2017 |
| CN | 107562685 A | 1/2018 |
| CN | 110224778 A | 9/2019 |
| CN | 112162591 A | 1/2021 |
| CN | 112260789 A | 1/2021 |
| WO | WO 2021/047313 A1 | 3/2021 |

* cited by examiner

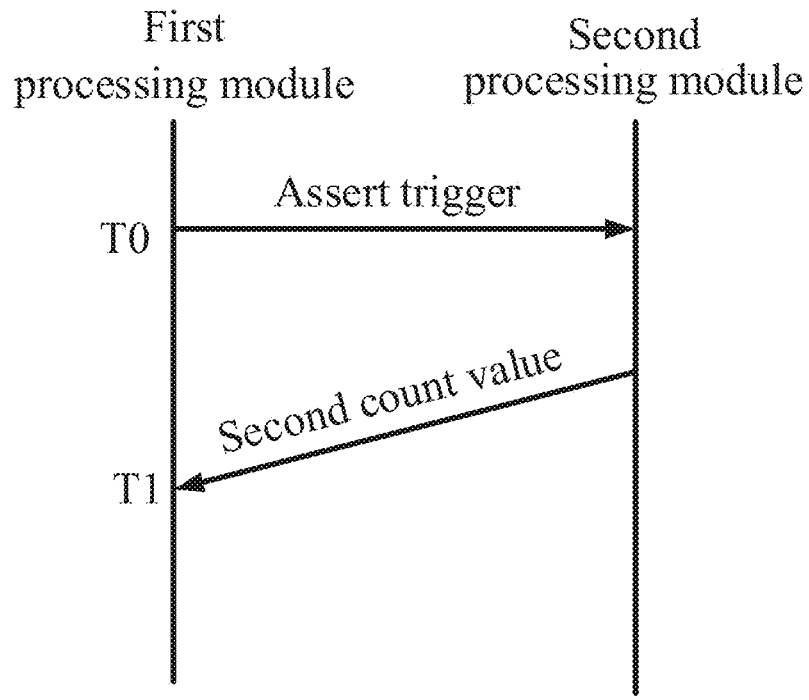

Fig. 5

Compare a magnitude relationship between the first count value and the second count value  ⸺ S401

In response to the first count value being smaller than the second count value, perform the clock compensation according to a deviation between the first count value and the second count value to synchronize the first clock domain where the first processing module is located with the second clock domain where the second processing module is located  ⸺ S402

Fig. 6

CLOCK SYNCHRONIZATION METHOD AND APPARATUS, ELECTRONIC DEVICE AND STORAGE MEDIUM

CROSS-REFERENCE TO RELATED APPLICATION

The present disclosure claims priority of the Chinese Patent Application No. 202211445758.7, filed on Nov. 18, 2022, the entire disclosure of which is incorporated herein by reference as part of the present disclosure.

TECHNICAL FIELD

Embodiments of the present disclosure relate to a clock synchronization method, a system clock synchronization method, a clock synchronization apparatus, an electronic device, and a non-transitory computer-readable storage medium.

BACKGROUND

Due to the system limitation of the large-scale integrated circuit, it is often necessary to exchange data between multiple clock frequency systems, as well as to receive and send data, or process an asynchronous signal between different clock frequency systems through input and output interfaces. In other words, there may be multiple clock domains in an integrated circuit, each clock domain is a region of the integrated circuit controlled by the same clock signal.

Clock signals corresponding to different clock domains are called asynchronous clocks. For two interconnected modules in an integrated circuit, each of which may consist of some circuit logic that complete a specific function, if the two modules are driven by different clocks (i.e., asynchronous clocks), the clock signals of the two modules are called asynchronous clock signals (asynchronous interface), and the two modules belong to different clock domains; and if the two modules are driven by the same clock, the clock signals of the two modules are called synchronous clock signals (synchronous interface), and the two modules belong to the same clock domain.

SUMMARY

This Summary section is provided to introduce concepts in a brief form, which will be described in detail in the Detailed Description section later. This Summary section is not intended to identify key features or essential features of the technical solution claimed to be protected, nor is it intended to limit the scope of the technical solution claimed to be protected.

At least one embodiment of the present disclosure provides a clock synchronization method for a first processing module, the first processing module includes a first timer, a count value of the first timer is used as a timing reference of the first processing module and sequentially increasing, and the clock synchronization method includes: sending a trigger signal to a second processing module and recording a current count value of the first timer upon sending the trigger signal as a first count value, the second processing module and the first processing module belong to different clock domains; and reading a second count value from the second processing module, the second count value is a current count value of a second timer of the second processing module upon the second processing module receiving the trigger signal, and a count value of the second timer is used as a timing reference of the second processing module and sequentially increasing; the first count value and the second count value are used for a clock compensation to synchronize a first clock domain where the first processing module is located with a second clock domain where the second processing module is located.

At least one embodiment of the present disclosure provides a clock synchronization method for a second processing module, the second processing module includes a second timer, a count value of the second timer is used as a timing reference of the second processing module and sequentially increasing, and the clock synchronization method includes: in response to receiving a trigger signal sent by a first processing module, recording a current count value of the second timer as a second count value, the second processing module and the first processing module belong to different clock domains; the second count value is used for a clock compensation in combination with a first count value to synchronize a first clock domain where the first processing module is located with a second clock domain where the second processing module is located, the first count value is a current count value of a first timer of the first processing module upon the first processing module sending the trigger signal to the second processing module, and a count value of the first timer is used as a timing reference of the first processing module and sequentially increases.

At least one embodiment of the present disclosure provides a system clock synchronization method, the system includes a first processing module and a second processing module, the first processing module includes a first timer, a count value of the first timer being used as a timing reference of the first processing module and sequentially increasing, the second processing module includes a second timer, a count value of the second timer being used as a timing reference of the second processing module and sequentially increasing, the first processing module and the second processing module belong to different clock domains, and the system clock synchronization method includes: sending, by the first processing module, a trigger signal to the second processing module, recording, by the first processing module, a current count value of the first timer at the time of sending the trigger signal as a first count value, and recording, by the second processing module, a current count value of the second timer upon receiving the trigger signal as a second count value; the first count value and the second count value are used for a clock compensation to synchronize a first clock domain where the first processing module is located with a second clock domain where the second processing module is located.

At least one embodiment of the present disclosure provides a clock synchronization apparatus for a first processing module, the first processing module includes a first timer, a count value of the first timer being used as a timing reference of the first processing module and sequentially increasing, and the clock synchronization apparatus includes: a first recording unit configured to send a trigger signal to a second processing module and record a current count value of the first timer upon sending the trigger signal as a first count value, the second processing module and the first processing module belong to different clock domains; and a reading unit configured to read a second count value from the second processing module, the second count value is a current count value of a second timer of the second processing module upon the second processing module receiving the trigger signal, and a count value of the second timer is used as a timing reference of the second processing module and sequentially increasing; the first count value and the second count value are used for a clock compensation to synchronize a first clock domain where the first processing module is located with a second clock domain where the second processing module is located.

At least one embodiment of the present disclosure provides a clock synchronization apparatus for a second processing module, the second processing module includes a second timer, a count value of the second timer being used as a timing reference of the second processing module and sequentially increasing, and the clock synchronization apparatus includes: a second recording unit, configured to, in response to receiving a trigger signal sent by a first processing module, record a current count value of the second timer as a second count value, the second processing module and the first processing module belong to different clock domains; the second count value is used for a clock compensation in combination with a first count value to synchronize a first clock domain where the first processing module is located with a second clock domain where the second processing module is located, the first count value is a current count value of a first timer of the first processing module upon the first processing module sending the trigger signal to the second processing module, and a count value of the first timer is used as a timing reference of the first processing module and sequentially increases.

At least one embodiment of the present disclosure provides an electronic device, which includes a first processing module and a second processing module, the first processing module includes a first timer, a count value of the first timer being used as a timing reference of the first processing module and sequentially increasing, the second processing module includes a second timer, a count value of the second timer being used as a timing reference of the second processing module and sequentially increasing, and the first processing module and the second processing module belong to different clock domains; the first processing module is configured to send a trigger signal to the second processing module and record a current count value of the first timer upon sending the trigger signal as a first count value, the second processing module is configured to record a current count value of the second timer upon receiving the trigger signal as a second count value, and the first count value and the second count value are used for a clock compensation to synchronize a first clock domain where the first processing module is located with a second clock domain where the second processing module is located.

At least one embodiment of the present disclosure provides an electronic device, which includes: a memory non-transiently storing computer-executable instructions, and a processor configured to execute the computer-executable instructions, the computer-executable instructions upon being executed by the processor implement the clock synchronization method or the system clock synchronization method according to any of the embodiments of the present disclosure.

At least one embodiment of the present disclosure provides a non-transitory computer-readable storage medium, wherein the non-transitory computer-readable storage medium stores computer-executable instructions, the computer-executable instructions upon being executed by a processor implement the clock synchronization method or the system clock synchronization method according to any of the embodiments of the present disclosure.

BRIEF DESCRIPTION OF THE DRAWINGS

In order to illustrate the technical solutions of the embodiments of the present disclosure more clearly, the drawings of the embodiments are briefly introduced below. Apparently, the drawings described below only relate to some embodiments of the present disclosure, rather than limiting the present disclosure.

FIG. 5 is a diagram of an interactive process of a clock synchronization method provided by at least one embodiment of the present disclosure;

FIG. 6 is a flowchart of a clock synchronization method provided by at least one embodiment of the present disclosure;

DETAILED DESCRIPTION

In order to make objects, technical solutions and advantages of the embodiments of the present disclosure apparent, the technical solutions of the embodiments are described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by those of ordinary skill in the art to which the present disclosure belongs. The terms "first", "second", and the like, which are used in the description and the claims of the present disclosure, are not intended to indicate any sequence, amount or importance, but used to distinguish various components. Similarly, the terms "a", "an", "the", or the like are not intended to indicate a limitation of quantity, but indicate that there is at least one. The terms, such as "comprise/comprising", "include/including", or the like are intended to specify that the elements or the objects stated before these terms encompass the elements or the objects and equivalents thereof listed after these terms, but not preclude other elements or objects. The terms, such as "connect/connecting/connected", "couple/coupling/coupled", or the like, are not limited to a physical connection or mechanical connection, but may include an electrical connection/coupling, directly or indirectly. The terms, "on", "under", "left", "right", or the like are only used to indicate relative position relationship, and when the position of the object which is described is changed, the relative position relationship may be changed accordingly. In order to keep the following description of the embodiments of the present disclosure clear and concise, the present disclosure omits detailed descriptions of some well-known functions and well-known components.

In certain scenarios, it is necessary for each asynchronous clock domain to be able to synchronize and collaborate, that is, to keep each asynchronous clock domain synchronized.

Figure 1:
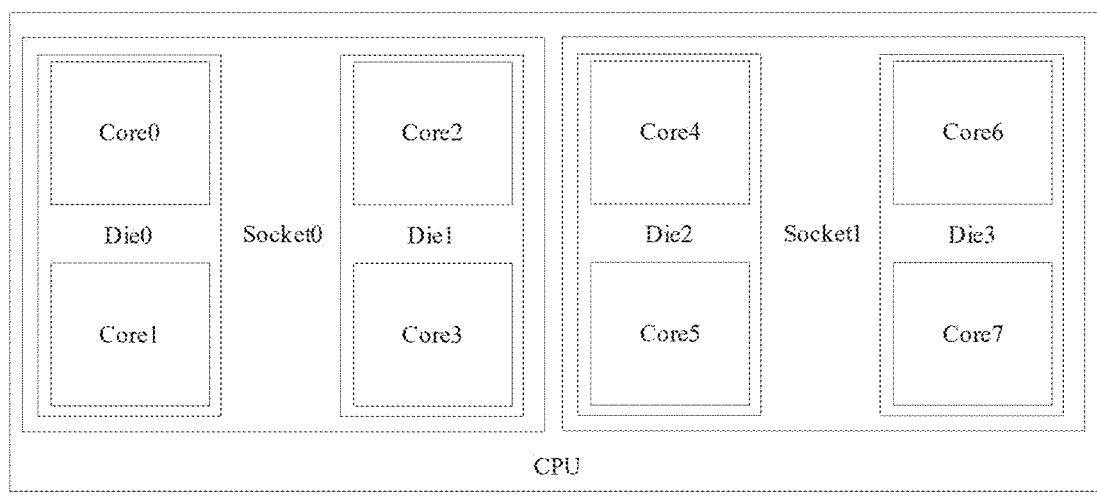
FIG. 1 is a diagram of a hierarchical structure of a central processing unit.

For example, the physical hierarchical structure of a central processing unit (CPU) is illustrated in FIG. 1.

As illustrated in FIG. 1, the CPU includes two physical sockets, each capable of accommodating a CPU package (or CPU socket), such as Socket0 and Socket1 illustrated in FIG. 1.

Each CPU package may include one or more CPU dies. The CPU die refers to the individual small squares that are cut from a silicon wafer during the production process. Before being cut, each small square (die) undergoes various processes to have circuitry logic etched onto it. Each CPU die can be considered as a processing unit with circuitry logic. As illustrated in FIG. 1, each CPU package consists of two dies, for example, Socket0 consists of Die0 and Die1.

Each CPU die may include one or more CPU cores. For example, as illustrated in FIG. 1, DIE0 includes Core0 and Core1.

Of course, FIG. 1 only provides an illustrative representation of a CPU, and the number of CPU packages, the number of CPU dies in each CPU package, and the number of CPU cores in each CPU die may vary for different CPUs, which is not described in detail here.

For example, since each CPU die or CPU socket is physically independent, each CPU die or CPU socket typically has its own phase locked loop (PLL) for generating a work clock signal or a reference clock signal.

For example, the PLL can receive a clock signal provided by a clock source (e.g., 100 MHz) and multiply the clock signal to generate a work clock signal (e.g., 2.4 GHz) and the CPU die or CPU socket performs operations based on the work clock signal. Additionally, the PLL provides a reference clock signal (e.g., 100 MHz) to devices such as system timers according to the clock signal so that these devices can operate normally.

For example, each processing module on the CPU (e.g., CPU die or CPU socket) has its own system timer, which provides a timing reference. For example, the system timer usually selects the most precise timer on a chip as the timing reference for system time, avoiding significant time drift after long periods of system operation. For example, a count value of the system timer serves as a timing reference for the respective processing module and sequentially increases. For example, after a system restart, time can be retrieved from a real-time clock (RTC) to continue periodic counting based on this time as a reference for setting a system clock and providing an alarm or a recurring timer.

For example, for symmetrical multi-processing (SMP), multiple processing modules (such as CPU Die or CPU Socket) share a memory and a bus structure. In order to achieve higher synchronization and collaboration efficiency among multiple processing modules, it is necessary to ensure that the system timers of these modules maintain the same count value, so as to meet the need of timer (system tick)-triggered scheduling, the need for inter-process communication (IPC) waiting timeout synchronization, and the need for adding time stamps during the debugging phase.

Figure 2:
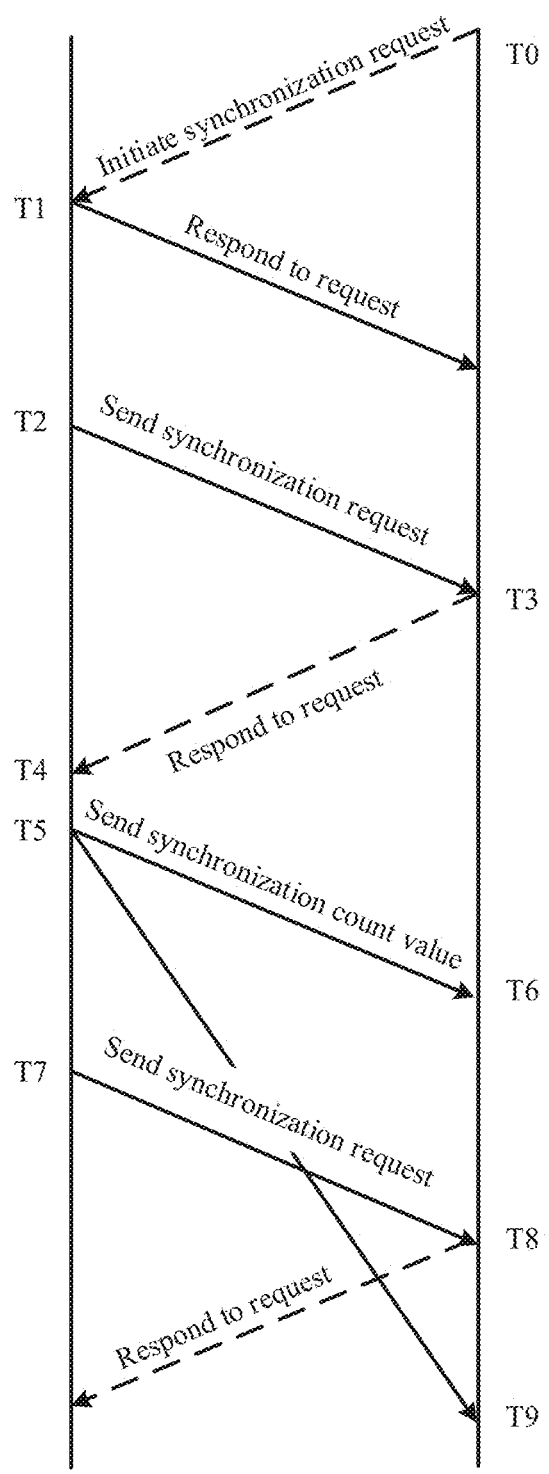
FIG. 2 is a diagram of a clock synchronization process.

FIG. 2 is a diagram of a clock synchronization process. It is applied to a master processing module (such as master CPU die) and a slave processing module (such as slave CPU die).

As illustrated in FIG. 2, at time T0, the slave processing module initiates a synchronization request to the master processing module, requesting synchronization. At time T1, the master processing module receives the request and responds to accept the request. At time T2, the master processing module initiates synchronization by sending a synchronization request to the slave processing module. At time T3, the slave processing module receives the request and responds to accept the request. At time T4, the master processing module receives the response from the slave processing module, completing a handshake.

At time T5, the master processing module sends a synchronization count value to the slave processing module. At time T6, the slave processing module receives the count value, which is related to the time T5, communication delay, etc.

At time T7, the master processing module sends another synchronization request. At time T8, the slave processing module accepts the request, responds to the master processing module, and (e.g., at the same time) updates its own count value.

For example, if the slave processing module receives the synchronization count value but the synchronization fails (e.g. no response received after a timeout), a new round of synchronization process will start at time T9.

In the synchronization process illustrated in FIG. 2, multiple stages need to be passed before synchronization can be completed, with a relatively high risk of synchronization failure. And because the communication between processing modules needs to be realized through the on-chip bus or interconnected bus, multiple stages of communication will increase the impact of clock jitter and delay on the bus, resulting in lower synchronization accuracy.

Additionally, an efficient solution for handling non-homologous clocks is lacking when the clock sources providing clock signals for the master processing module and the slave processing module are non-homologous clocks. For example, for non-homologous clocks, when measuring the time taken for a certain operation, the thread executing the operation may switch from processing module A to processing module B. In this case, the measurement start time is based on a clock signal of the processing module A, and the measurement end time is based on a clock signal of the processing module B. This can result in clock measurement problems because the clock signals of the processing module A and the processing module B are asynchronous clock signals. For example, calibration is often required for non-homologous clocks, and when the time calibration is performed during the execution process, applications related to time measurement/delay will encounter errors.

At least one embodiment of the present disclosure provides a clock synchronization method, a clock synchronization apparatus, a system clock synchronization method, an electronic device and a non-transitory computer-readable storage medium.

The system clock synchronization method includes: sending a trigger signal to a second processing module and recording a current count value of the first timer at the time of sending the trigger signal as a first count value, the second processing module and the first processing module belonging to different clock domains; and reading a second count value from the second processing module, the second count value being a current count value of a second timer of the second processing module when the second processing module receives the trigger signal, and a count value of the second timer being used as a timing reference of the second processing module and sequentially increasing; the first count value and the second count value are used for clock compensation, so that a first clock domain where the first processing module is located is synchronized with a second clock domain where the second processing module is located. For example, the first count value is recorded at the same time of sending a trigger signal to a second processing module.

In at least one embodiment, the first processing module and the second processing module freeze current count values of system timers based on the same trigger signal and record the current count values respectively. This allows understanding of the relationship and deviation between the timers based on their count values, and the clock compensation can be achieved using these count values. This clock synchronization method significantly reduces the number of stages required for clock synchronization. By recording the count values of the timers using the same trigger signal, the relationship and deviation between the timers are obtained, which does not lead to synchronization failure even if there is a subsequent communication failure, and the synchronization accuracy is greatly improved. It eliminates software intervention, reduces the impact of clock jitter and delay on a bus, reduces the number of interfaces used for clock synchronization from two to one, reduces interface usage, and improves resource utilization.

Embodiments of the present disclosure are described in detail with reference to the accompanying drawings, but the present disclosure is not limited to these specific embodiments.

Figure 3:
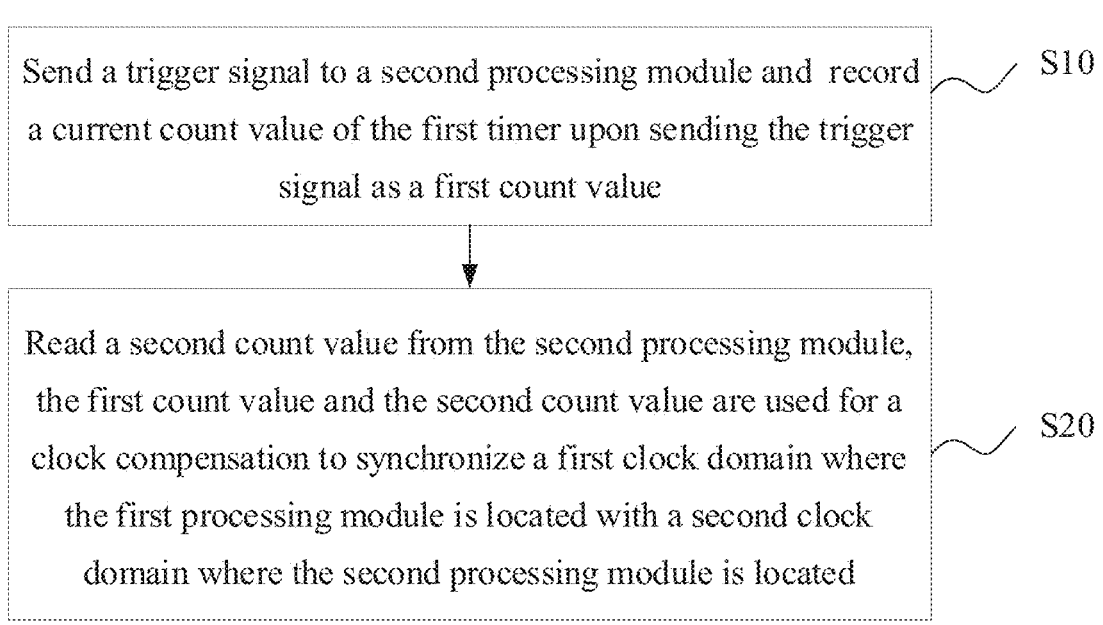
FIG. 3 is a schematic flowchart of a clock synchronization method provided by at least one embodiment of the present disclosure.

FIG. 3 is a schematic flowchart of a clock synchronization method provided by at least one embodiment of the present disclosure.

For example, the clock synchronization method is applied to a first processing module, the first processing module includes a first timer, and a count value of the first timer is used as a timing reference of the first processing module and sequentially increases. For example, the first timer is a system timer of the first processing module.

As illustrated in FIG. 3, the clock synchronization method provided by at least one embodiment of the present disclosure includes steps S10-S20.

For example, in S10, sending a trigger signal to a second processing module and (e.g., at the same time) recording a current count value of the first timer upon sending the trigger signal as a first count value.

For example, the first count value is recorded in a register of the first processing module.

For example, in S20, reading a second count value from the second processing module.

For example, the second count value is a current count value of a second timer of the second processing module when the second processing module receives the trigger signal, and a count value of the second timer is used as a timing reference of the second processing module and sequentially increases.

For example, the second timer is a system timer of the second processing module.

For example, the second count value is recorded in a register of the second processing module.

For example, the first count value and the second count value are used for the clock compensation, so that a first clock domain where the first processing module is located is synchronized with a second clock domain where the second processing module is located.

For example, the first processing module and the second processing module can be CPU dies or CPU sockets. For example, the first processing module can be Die0 in FIG. 1 and the second processing module can be Die1 in FIG. 1. For another example, the first processing module can be Socket0 in FIG. 1 and the second processing module can be Socket1 in FIG. 1. Of course, the first processing module and the second processing module can be other hardware modules that need clock synchronization. The present disclosure does not specifically limit the structures and functions of the first processing module and the second processing module.

For example, the second processing module and the first processing module belong to different clock domains.

For example, an integrated circuit includes a first clock domain determined based on a first clock source and a second clock domain determined based on a second clock source. For example, the first clock domain is an area controlled by the first clock source, and the first processing module is located in the first clock domain. For example, the second clock domain is an area controlled by the second clock source, and the second processing module is located in the second clock domain. For example, Die0 and Die1 in FIG. 1 belong to two different clock domains. For example, Die0 is located in the first clock domain and works according to a first reference clock signal provided by the first clock source, while Die1 is located in the second clock domain and works according to a second reference clock signal provided by the second clock source.

For example, the fact that the second processing module and the first processing module belong to different clock domains means that they belong to asynchronous clock domains, which may be caused by the following two reasons.

1. The first processing module includes a first phase locked loop, which is configured to receive a first reference clock signal provided by a first clock source, and generate a first work clock signal according to the first reference clock signal and provide it to the first processing module. The second processing module includes a second phase locked loop, which is configured to receive the first reference clock signal provided by the first clock source, and generate a second work clock signal according to the first reference clock signal and provide it to the second processing module. That is, the first processing module and the second processing module have their own phase locked loops, but the phase locked loops receive homologous clock signals. Since the time phase relationship locked during power-up is random, the phase relationship between launch edges and capture edges of different phase locked loops is also random. Therefore, even though the first processing module and the second processing module essentially receive homologous clock signals, they still need to be treated as asynchronous clock domains.

2. The first processing module is provided with a reference clock signal by a first clock source, the second processing module is provided with a reference clock signal by a second clock source, and the first clock source and the second clock source are non-homologous clock sources. In this case, the first processing module includes a first phase locked loop, which is configured to receive a first reference clock signal provided by the first clock source, and generate a first work clock signal according to the first reference clock signal and provide it to the first processing module; and the second processing module includes a second phase locked loop, which is configured to receive a second reference clock signal provided by the second clock source, and generate a second work clock signal according to the second reference clock signal and provide it to the second processing module. The first clock signal and the second clock signal are asynchronous clock signals. For example, for non-homologous clock sources, even though a phase locked loop can achieve phase tracking, because it is impossible for two crystal oscillators to have exactly the same frequency, non-homologous clock sources not only have different phases but also different clock rates.

It should be noted that the integrated circuit can also include a third clock domain, a fourth clock domain, etc., that is, the integrated circuit can include a plurality of clock domains. During clock synchronization, two processing modules controlled by asynchronous clocks are selected from a plurality of processing modules as the first processing module and the second processing module. Clock synchronization is then performed on the asynchronous clocks corresponding to these two processing modules based on the clock synchronization method provided by the present disclosure.

In the clock synchronization method provided by at least one embodiment of the present disclosure, the snapshot function of the first timer and the second timer is realized, for example, when the first timer and the second timer receive a rising edge of the same trigger signal (such as a timer trigger signal or a signal of a universal input/output interface), a current count value of the first timer is frozen to a register in the first processing module, and the current count value of the second timer is frozen to a register in the second processing module. Because multiple timers are triggered synchronously by only one signal, the relationship and deviation between the multiple timers can be obtained by reading the registers used to store the recorded count values of each timer, so as to determine a compensation value for clock compensation. For example, clock compensation is performed according to a deviation between the first count value and the second count value, so that a first clock domain where the first processing module is located is synchronized with a second clock domain where the second processing module is located.

The handling methods for clock synchronization differ depending on the asynchronous clock domains caused by different reasons. The processing steps for the asynchronous clock domains caused by two different reasons will be explained below, combined with the accompanying drawings.

For example, taking CPU as an example, multiple processing modules usually include a master processing module and multiple slave processing modules. The master processing module is usually responsible for scheduling and coordination, delegating the execution of services to different slave processing modules.

For example, in the following embodiment, the first processing module is taken as a slave processing module and the second processing module is taken as a master processing module. Of course, the present disclosure is not limited to this, and those skilled in the art can also select the first processing module as the master processing module and the second processing module as the slave processing module according to actual needs, or there may be no master-slave relationship between the first processing module and the second processing module.

In the case where the first processing module and the second processing module are provided with reference clock signals by homologous clock sources but have different phase locked loops, the reference clock signals received by the first processing module and the second processing module have the same frequency after being processed by the phase locked loops, but with a fixed phase difference. Therefore, the first processing module only needs to obtain a first count value and a second count value and compensate the first timer based on a difference between the first count value and the second count value. After compensation, the first timer and the second timer will remain synchronized and do not require further maintenance unless there is a power reset. For example, clock compensation can be triggered by software when needed, such as setting a flag bit and performing compensation when the flag bit is valid. Since the deviation of the count values has already been recorded in the register through the same trigger signal, the problem of synchronization failure is eliminated.

For example, clock synchronization is performed when the first processing module is in a power-on stage, that is, right after the first processing module is powered on and has not performed any specific operation. In this case, because the first processing module has not performed the specific operation, the clock compensation can be performed without considering the problem of maintaining a monotonically increasing time.

Of course, if the clock synchronization is performed when the first processing module is working, that is, the first processing module has already the performed specific operation, the problem of a monotonically increasing time needs to be considered. For the specific process, please refer to the relevant explanations in the non-homologous clock sources later, which will not be elaborated here.

Figure 4:
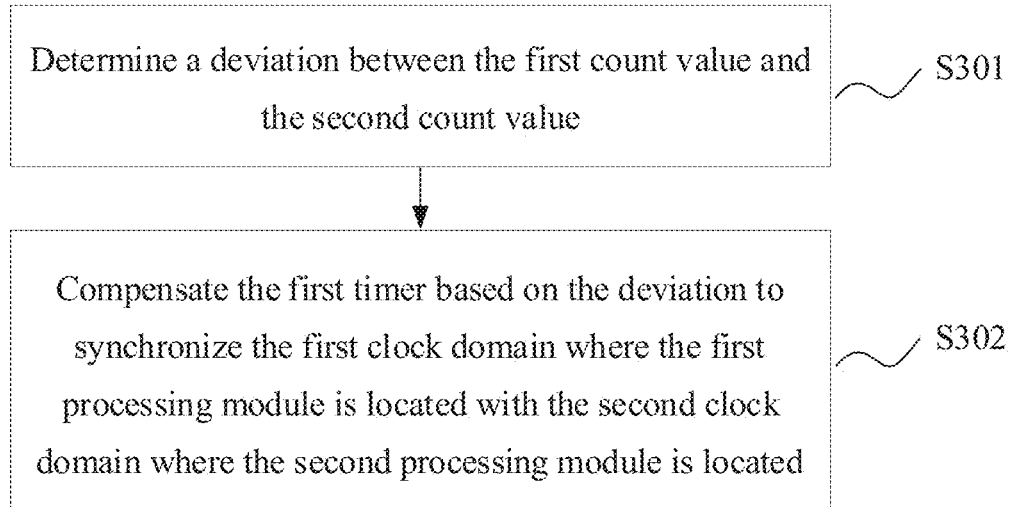
FIG. 4 is a flowchart of a clock synchronization method provided by at least one embodiment of the present disclosure.

FIG. 4 is a flowchart of a clock synchronization method provided by at least one embodiment of the present disclosure.

As illustrated in FIG. 4, after S20, the clock synchronization method further includes S301 and S302.

In S301, determining a deviation between the first count value and the second count value.

In S302, compensating the first timer based on the deviation to synchronize the first clock domain where the first processing module is located with the second clock domain where the second processing module is located.

For example, in S301, the deviation is a difference between the first count value and the second count value.

For example, S302 may include: acquiring a current count value of the first timer as a third count value; adding the deviation and the third count value to obtain an updated count value; and updating the count value of the first timer to the updated count value to synchronize the first clock domain where the first processing module is located with the second clock domain where the second processing module is located.

For example, the first count value is N1, the second count value is N2, and N1 and N2 are positive integers. The deviation between the first count value and the second count value is, for example, N1−N2.

For example, after calculating the deviation, clock compensation can be performed when necessary. For example, when a flag bit indicating clock compensation is valid, the current count value N3 of the first timer is obtained as the third count value, N3+N1−N2 is calculated as the updated count value, and the count value of the first timer is updated to the updated count value N3+N1−N2. For example, when the flag bit indicating clock compensation is invalid, the count value of the first timer is continuously increased according to the frequency of the reference clock signal, for example, increased by 1 every clock cycle.

For example, the trigger signal is also configured to simultaneously trigger an interrupt of the first processing module to perform clock compensation. For example, in the case of homologous clocks, the first processing module can simply adjust the count value of the first timer, so it is only necessary to trigger an interrupt of the first processing module, interrupting the current application service, so as to perform clock compensation and then continue executing the application service.

FIG. 5 is a diagram of an interactive process of a clock synchronization method provided by at least one embodiment of the present disclosure.

As illustrated in FIG. 5, at time T0, the first processing module initiates "assert trigger" to the second processing module. In this case, the first processing module records the current count value of the first timer as the first count value when sending the trigger signal and stores it in a first register, for example, the first register is located in the first processing module and can store the value statically. At the same time, when receiving the trigger signal, the second processing module records the current count value of the second timer as the second count value and stores it in a second register. For example, the second register is located in the second processing module and can store the value statically. Moreover, the trigger signal also triggers an interrupt of the first processing module.

Afterwards, at time T1, the first processing module reads a value of the second register in the second processing module to obtain the second count value, and performs clock compensation by referring to the above steps S301 and S302, and the detailed process will not be described again.

In the present embodiment, due to clock homology, there is a fixed phase difference between the first processing module and the second processing module. Based on the deviation between the first count value and the second count value, this fixed phase difference can be compensated for, and compensation is only required once, without the need for further maintenance unless there is a power reset. This implementation is simple and effective, eliminating synchronization failure, significantly reducing the number of clock synchronization phases, and greatly reducing the number of communication rounds between the first processing module and the second processing module. This reduces the impact of clock jitter and delay on interconnect cables or on-chip networks, improving the accuracy of clock synchronization.

When the first processing module and the second processing module are provided with reference clock signals by non-homologous clock sources, both the clock frequency and the clock phase need to be adjusted, and the clock frequency will drift with time. Therefore, regular clock synchronization is required in this case.

For example, clock synchronization can be performed periodically when the first processing module is in a working state. The working state here indicates that the first processing module has completed power-on initialization and is able to perform any operation such as computation. In this case, the regularly performed clock synchronization includes recording the first count value and the second count value, and the whole clock compensation process.

Throughout the whole clock synchronization process, that is, during the whole operation of the first processing module and the second processing module, the count values of the first timer and the second timer remain monotonically increasing. In contrast to a single time of clock synchronization required for homologous clock sources, in the case of non-homologous clock sources, clock synchronization needs to be performed periodically, and clocks of the first processing module or the second processing module need to remain monotonically increasing. Otherwise, errors may occur in clock measurement and delay-related application services.

Therefore, in the present embodiment, during clock synchronization, after obtaining the first count value and the second count value recorded based on the same trigger signal, it is necessary to determine which processing module (the first processing module or the second processing module) has a faster clock based on the first count value and the second count value. The slower side is selected for clock compensation in order to make the clock align with the faster side.

FIG. 6 is a flowchart of a clock synchronization method provided by at least one embodiment of the present disclosure.

As illustrated in FIG. 6, after S20, the clock synchronization method further includes S401 and S402.

In S401, comparing a magnitude relationship between the first count value and the second count value.

In S402, in response to the first count value being smaller than the second count value, performing the clock compensation according to a deviation between the first count value and the second count value to synchronize the first clock domain where the first processing module is located with the second clock domain where the second processing module is located.

For example, if the first count value is smaller than the second count value, it means that the clock of the first processing module is slower than that of the second processing module and the clock of the first processing module needs to be adjusted to align with the clock of the second processing module.

For example, S402 may include: determining the deviation between the first count value and the second count value; and compensating the first timer based on the deviation to synchronize the first clock domain where the first processing module is located with the second clock domain where the second processing module is located.

The specific clock compensation process may vary based on the type of clock source. The following describes the specific compensation process for different types of clock sources.

For example, for crystal oscillators that can adjust an oscillation frequency of the clock source by voltage, such as a voltage control crystal oscillator (VCXO) or a voltage control temperature compensate crystal oscillator (VCTCXO), an output frequency of the crystal oscillator can be controlled by inputting a regulation voltage to a voltage control pin of the crystal oscillator. This allows the oscillation frequency of the crystal oscillator to converge towards a target oscillation frequency, achieving accuracy at the ppb (parts-per-billion) level.

For example, in the present embodiment, the deviation between the first count value and the second count value is first obtained, for example, the deviation is the difference between the first count value and the second count value.

For example, in this embodiment, S402 may include: compensating the first timer according to the deviation; determining a regulation voltage according to the deviation; and compensating the first clock source according to the regulation voltage, so that the first clock domain where the first processing module is located is synchronized with the second clock domain where the second processing module is located.

For example, the process of compensating the first timer based on the deviation is similar to that of homologous clock sources. Firstly, a current count value of the first timer is obtained as a third count value. Then, the deviation is added to the third count value to obtain an updated count value. Finally, the count value of the first timer is updated to the updated count value. The specific process is not further elaborated here.

For example, determining the regulation voltage according to the deviation may include: calculating a unit time frequency deviation between the first clock source and the second clock source according to the deviation; and determining the regulation voltage according to the unit time frequency deviation.

For example, the unit time frequency deviation is in ppm (parts-per-million) or ppb. For example, the unit time frequency deviation can be the ratio of the deviation to an operating frequency of the first timer.

For a voltage control oscillator, for example, a capacitance of a varactor diode can be adjusted through a regulation voltage, so as to "pull" the frequency of the crystal oscillator, achieving frequency modulation. Thus, based on the unit time frequency deviation, the regulation voltage can be determined, and the regulation voltage is related to the parameters of the crystal oscillator itself and the unit time frequency deviation.

For example, in some embodiments, determining the regulation voltage according to the deviation may include: obtaining a historical frequency deviation, the historical frequency deviation is the most recent unit time frequency deviation used to calculate the regulation voltage; calculating a weighted sum of the historical frequency deviation and the unit time frequency deviation calculated based on the deviation; and determining the regulation voltage according to a calculation result of the weighted sum.

For example, the regulation voltage is calculated as follows:

$$latest\_ppm = (1.0 - ema) * latest\_ppm + ema * current\_observed\_ppm$$

$$adj\_vlt = f(latest\_ppm) \quad \text{(Formula 1)}$$

where latest_ppm represents the historical frequency deviation, current_observed_ppm represents the unit time frequency deviation calculated based on the deviation, ema represents the weight coefficient, "=" represents the assignment, for example, assigning (updating) a weighted sum of the historical frequency deviation and the unit time frequency deviation calculated based on the deviation to the historical frequency deviation, adj_vlt represents the regulation voltage, and f(*) represents the functional relationship between the regulation voltage and the clock deviation (weighted sum).

For example, when the regulation voltage calculation is performed for the first time, the regulation voltage is directly calculated according to the current deviation, and the unit time frequency deviation calculated based on the current deviation is taken as the historical frequency deviation; and when performing the regulation voltage calculation for the second time, the weighted sum of the unit time frequency deviation calculated based on the current deviation and the historical frequency deviation is calculated, the regulation voltage is determined according to the weighted sum, and the historical frequency deviation is updated to the weighted sum; and so on.

In the present embodiment, the proportion of the historical frequency deviation or the current unit time frequency deviation can be adjusted according to the weight coefficient, and the voltage change and the clock change can be gently adjusted to avoid severe clock jitter.

For example, compensating the first clock source according to the regulation voltage, so that the first clock domain where the first processing module is located is synchronized with the second clock domain where the second processing module is located, may include: inputting the regulation voltage into a voltage control pin of the first clock source, so that an oscillation frequency of the first clock source converges towards an oscillation frequency of the second clock source, and the first clock source and the second clock source are synchronized.

For example, after the regulation voltage is input to the voltage control pin of the first clock source, the oscillation frequency of the first clock source will converge towards the oscillation frequency of the second clock source, and the convergence accuracy can reach the ppb level, so the period for maintenance and clock compensation can also be relaxed to a longer time before doing it once, for example, performing clock synchronization at intervals of 1 second. For example, when the convergence accuracy reaches 50 ppb, for a system clock with a working frequency of 100 MHz, performing clock synchronization once a second will produce an error of 5 cycles.

For example, the trigger signal is also configured to trigger interrupts of the first processing module and the second processing module at the same time to perform clock compensation. For example, because both the first processing module and the second processing module have the possibility of adjusting the counting values of their own timers and clock rates in the case of non-homologous clocks, it is necessary to trigger interrupts of both the first processing module and the second processing module, interrupting their current application services, so as to perform clock compensation and then continue executing the application services.

In the above embodiment, since the frequency of the crystal oscillator can be adjusted by voltage, for example, when the clock of the first processing module is slower than the clock of the second processing module, the oscillation frequency of the first clock source can be made to converge towards the oscillation frequency of the second clock source by voltage. Therefore, the interval for "periodical" clock synchronization can be set longer, such as reaching the seconds level. This has minimal impact on system performance as it does not require frequent interrupts to affect system performance, nor does it require frequent trigger signal generation for communication between the first and second processing modules, thereby not occupying communication resources of on-chip networks or interconnect cables. Further, it eliminates synchronization failure, significantly reduces the number of clock synchronization phases, and greatly reduces the number of communication rounds between the first processing module and the second processing module. This reduces the impact of clock jitter and delay on interconnect cables or on-chip networks, improving the accuracy of clock synchronization.

For example, for crystal oscillators that cannot adjust an oscillation frequency of the clock source by voltage, such as a simple crystal oscillator (XO), the stability of the XO is determined solely by the intrinsic characteristics of the crystal resonator itself. In this case, clock synchronization still occurs periodically when the first processing module is in operation. When it is determined that clock compensation needs to be performed by the first processing module, compensation can be performed on the first timer. The specific process is similar to the case of homologous clock sources. Firstly, the current count value of the first timer is obtained as a third count value. Then, the deviation is added to the third count value to obtain an updated count value. Finally, the count value of the first timer is updated to the updated count value, completing one time of clock compensation. The specific process is not further elaborated here.

In addition, in the present embodiment, the trigger signal is also configured to trigger interrupts of the first processing module and the second processing module at the same time to perform clock compensation.

For example, in the present embodiment, the interval for clock synchronization is dependent on a frequency deviation between the first clock source and the second clock source. If there is a large frequency deviation between the first clock source and the second clock source, the compensation interval will be relatively shorter compared to clock sources that can be voltage-controlled.

Figure 7:
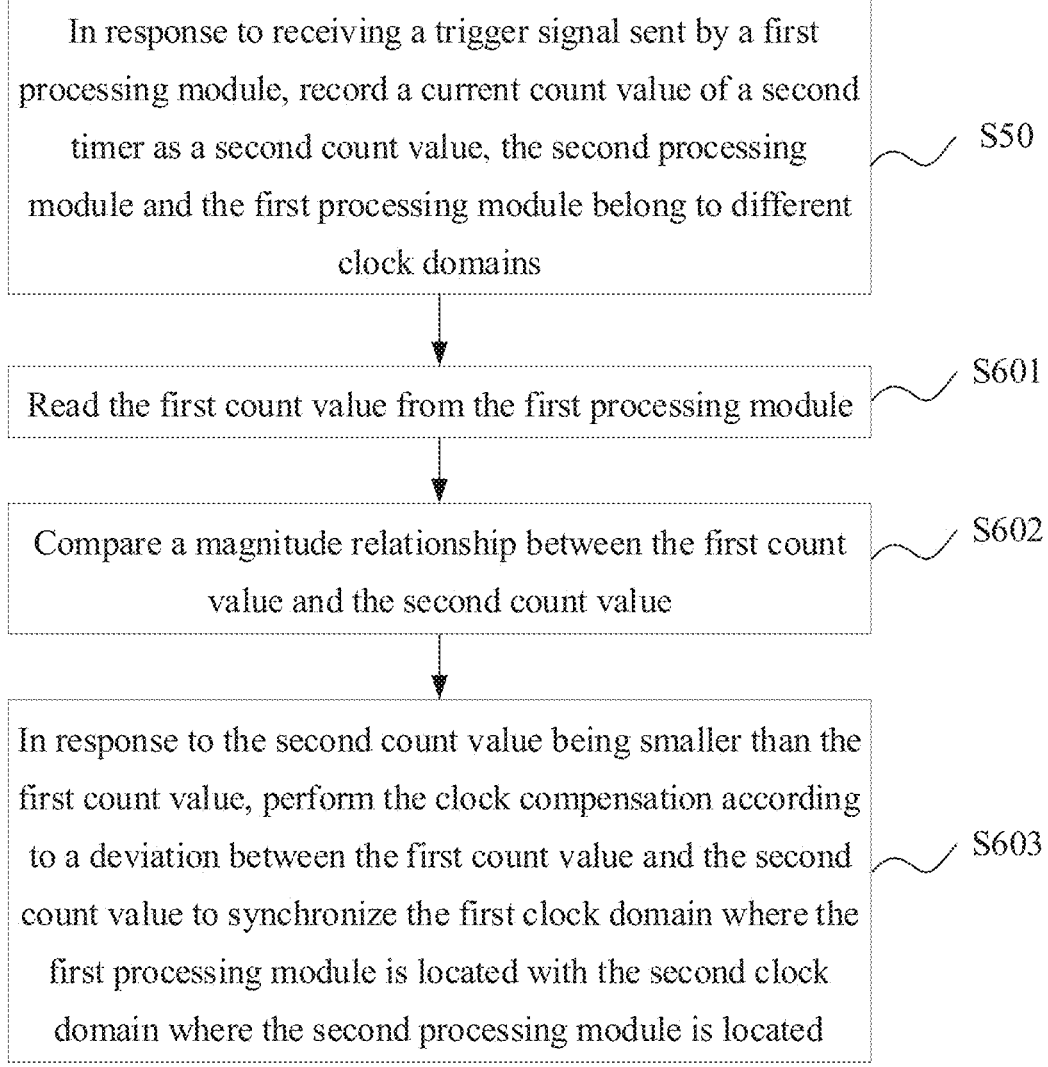
FIG. 7 is a schematic flowchart of another clock synchronization method provided by at least one embodiment of the present disclosure.

For example, at least one embodiment of the present disclosure further provides another clock synchronization method. FIG. 7 is a schematic flowchart of another clock synchronization method provided by at least one embodiment of the present disclosure.

For example, the clock synchronization method is applied a second processing module, the second processing module includes a second timer, and a count value of the second timer is used as a timing reference of the second processing module and sequentially increases. For example, the second timer is a system timer of the second processing module.

For the content of the second processing module and the second timer, please refer to the related introduction of the first processing module and the first timer in the previous embodiment, which will not be repeated here.

For example, as illustrated in FIG. 7, the clock synchronization method provided by at least one embodiment of the present disclosure at least includes step S50.

In S50, in response to receiving a trigger signal sent by a first processing module, recording a current count value of a second timer as a second count value, the second processing module and the first processing module belong to different clock domains.

For example, the second count value is used for clock compensation in combination with a first count value, so that a first clock domain where the first processing module is located is synchronized with a second clock domain where the second processing module is located, the first count value is a current count value of a first timer of the first processing module when the first processing module sends the trigger signal to the second processing module, and a count value of the first timer is used as a timing reference of the first processing module and sequentially increases.

For the related content of the first processing module, the first timer and the first count value, please refer to the related description of the first processing module, the first timer and the first count value in the previous embodiment, which will not be repeated here.

For example, referring to the related description in the previous embodiment, there are two reasons why the first processing module and the second processing module belong to different clock domains.

For example, when the first processing module and the second processing module have their own phase locked loops, but the phase locked loops receive homologous clock signals, as described in S301 and S302, the clock compensation is performed by the first processing module, the second processing module only needs to record the count value of the second timer when receiving the same trigger signal, and the second processing module can continue to perform required operations without interruption. The implementation process is simple, interruption is not required, and compensation can be performed only once when the first processing module and the second processing module are powered on, without the need for maintenance unless there is a power reset, which has little influence on system performance and results in high synchronization accuracy.

For example, when the first processing module is provided with a reference clock signal by a first clock source and the second processing module is provided with a reference clock signal by a second clock source, and the first clock source and the second clock source are non-homologous clock sources, as mentioned above, in this case, the non-homologous clock sources are not only different in phase, but also different in clock rate, so it is necessary to perform clock synchronization regularly, and the count values of the first timer and the second timer remain monotonically increasing throughout the clock synchronization process. It should be noted that the whole clock synchronization process here refers not only to a single time of clock synchronization, but also to multiple times of clock synchronization regularly performed, and the count values of the first timer and the second timer remain monotonically increasing.

In order to keep the clock monotonically increasing, as mentioned above, it is necessary to determine which processing module (the first processing module or the second processing module) has a faster clock. The slower side is selected for clock compensation in order to make the clock align with the faster side.

For example, as illustrated in FIG. 7, after S50, the clock synchronization method further includes S601-S603.

In S601, reading the first count value from the first processing module.

In S602, comparing a magnitude relationship between the first count value and the second count value.

In S603, in response to the second count value being smaller than the first count value, performing the clock compensation according to a deviation between the first count value and the second count value to synchronize the first clock domain where the first processing module is located with the second clock domain where the second processing module is located.

For example, the trigger signal is also configured to trigger interrupts of the first processing module and the second processing module at the same time to perform clock compensation.

For example, if the second count value is smaller than the first count value, it means that the clock of the second processing module is slower than that of the first processing module. In this case, the clock of the second processing module needs to be adjusted to align with the clock of the first processing module.

For example, S603 may include: determining a deviation between the first count value and the second count value; and compensating the second timer based on the deviation to synchronize the first clock domain where the first processing module is located with the second clock domain where the second processing module is located.

As mentioned above, the specific clock compensation process varies based on the type of clock source.

For example, in response to the second clock source being capable of adjusting the oscillation frequency by voltage, compensating the second timer based on the deviation to synchronize the first clock domain where the first processing module is located with the second clock domain where the second processing module is located may include: compensating the second timer according to the deviation; determining a regulation voltage according to the deviation; and compensating the second clock source according to the regulation voltage, so that the first clock domain where the first processing module is located is synchronized with the second clock domain where the second processing module is located.

For example, compensating the second clock source according to the regulation voltage, so that the first clock domain where the first processing module is located is synchronized with the second clock domain where the second processing module is located, may include: inputting the regulation voltage into a voltage control pin of the second clock source, so that an oscillation frequency of the second clock source converges towards an oscillation frequency of the first clock source, and the first clock source and the second clock source are synchronized.

For example, the deviation may be a difference between the first count value and the second count value.

For example, for the specific process of compensating the second timer according to the deviation, one can refer to the specific process of "compensating the first timer according to the deviation" in the aforementioned steps S302 and S402, which will not be repeated here.

For example, for the process of determining the regulation voltage and the specific process of adjusting the second clock source by using the regulation voltage, one can also refer to the above description of adjusting the first clock source by using the regulation voltage, which will not be repeated here.

The second timer is compensated by means of the deviation, the regulation voltage is calculated based on the deviation, and the regulation voltage is input to the voltage control pin of the second clock source, allowing the oscillation frequency of the second clock source to converge towards the oscillation frequency of the first clock source. Similarly, since the convergence accuracy can reach the ppb level, the period for maintenance and clock compensation can also be relaxed to a longer interval, such as performing clock synchronization every 1 second. This has minimal impact on system performance as it does not require frequent interrupts to affect system performance, nor does it require frequent trigger signal generation for communication between the first and second processing modules, thereby not occupying communication resources of on-chip networks or interconnect cables. Further, it eliminates synchronization failure, significantly reduces the number of clock synchronization phases, and greatly reduces the number of communication rounds between the first processing module and the second processing module. This reduces the impact of clock jitter and delay on interconnect cables or on-chip networks, improving the accuracy of clock synchronization.

For example, for crystal oscillators that cannot adjust an oscillation frequency of the clock source by voltage, the specific implementation process of clock compensation is similar to that performed by the first processing module in the same scenario mentioned above, which will not be repeated here.

For example, at least one embodiment of the present disclosure further provides a system clock synchronization method.

For example, the system may include a first processing module and a second processing module. The first processing module includes a first timer, and a count value of the first timer is used as a timing reference of the first processing module and sequentially increases. The second processing module includes a second timer, and a count value of the second timer is used as a timing reference of the second processing module and sequentially increases. The first processing module and the second processing module belong to different clock domains.

For example, the system can be a CPU as illustrated in FIG. 1, and the first processing module and the second processing module can be any two CPU dies or CPU sockets in FIG. 1. Of course, the present disclosure is not specifically limited to this, and other processing modules that need to perform clock synchronization are also possible.

For example, the first timer may be a system timer of the first processing module and the second timer may be a system timer of the second processing module. For the related description of the first timer and the second timer, please refer to the previous content, which will not be repeated here.

For example, the first processing module and the second processing module belong to asynchronous clock domains, the reasons for which are as mentioned above, which will not be repeated here.

For example, in some embodiments, the system clock synchronization method may include: sending, by the first processing module, a trigger signal to the second processing module, recording, by the first processing module, a current count value of the first timer at the time of sending the trigger signal as a first count value, and recording, by the second processing module, a current count value of the second timer at the time of receiving the trigger signal as a second count value; the first count value and the second count value are used for clock compensation, so that a first clock domain where the first processing module is located is synchronized with a second clock domain where the second processing module is located.

For example, for the specific process of using the first count value and the second count value for clock compensation, please refer to the related description of the clock synchronization method applied to the first processing module and the clock synchronization method applied to the second processing module.

For example, in the case where clock sources are homologous, but the first processing module and the second processing module have their own phase locked loops, the first timer is compensated according to the deviation between the first count value and the second count value, so as to synchronize the first clock domain and the second clock domain. For example, for the specific process of clock synchronization in this case, one can refer to the above-mentioned description of the clock synchronization method applied to the first processing module and the clock synchronization method applied to the second processing module, which will not be repeated here.

Figure 8A:
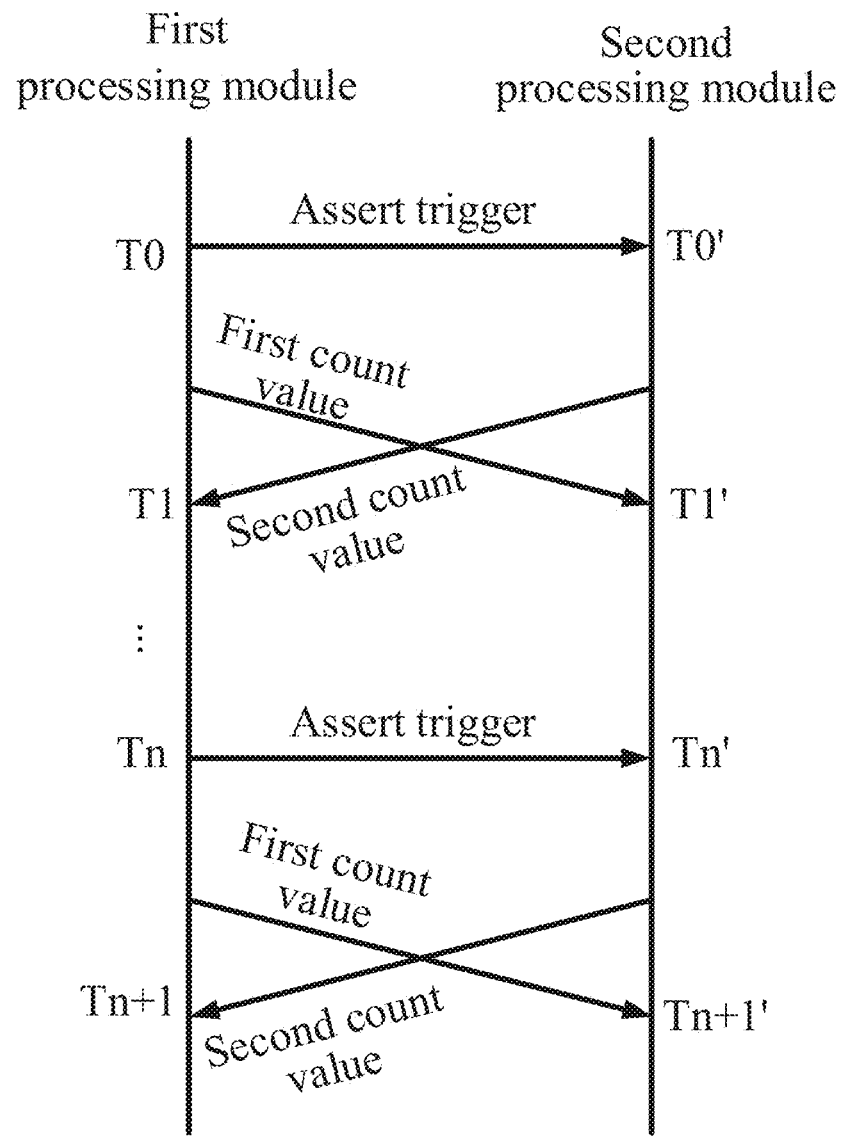
FIG. 8A is a diagram of an interactive process of a system clock synchronization method provided by at least one embodiment of the present disclosure.

FIG. 8A is a diagram of an interactive process of a system clock synchronization method provided by at least one embodiment of the present disclosure. Next, with reference to FIG. 8A, the execution process of the system clock synchronization method will be described under the condition that the first clock source and the second clock source are non-homologous clock sources.

As illustrated in FIG. 8A, at time T0, the first processing module initiates "assert trigger" to the second processing module. In this case, the first processing module records the current count value of the first timer as the first count value when sending the trigger signal and stores it in a first register, for example, the first register is located in the first processing module and can store the value statically. At the same time, when receiving the trigger signal (at time T0'), the second processing module records the current count value of the second timer as the second count value and stores it in a second register. For example, the second register is located in the second processing module and can store the value statically. Moreover, the trigger signal also triggers interrupts of the first processing module and the second processing module.

Then, at time T1, the first processing module reads a value of the second register in the second processing module to obtain the second count value, and at time T1', the second processing module reads a value of the first register in the first processing module to obtain the first count value, where T1 may be equal to or different from T1'.

Afterwards, the first processing module and the second processing module compare the recorded count values and the read count values, and if the recorded count value is smaller than the read count value, clock compensation is executed, otherwise, clock compensation is not executed.

For example, for the first processing module, after obtaining the second count value, in S401, the first count value and the second count value are compared, and if the first count value is smaller than the second count value, clock compensation is performed with reference to S402. For the specific process, one can refer to the related description of S402, which will not be repeated here.

For example, for the second processing module, after obtaining the first count value, in S602, the first count value and the second count value are compared, and if the second count value is smaller than the first count value, clock compensation is performed with reference to S603. For the specific process, one can refer to the related description of S603, which will not be repeated here.

Therefore, the clock keeps increasing monotonically during the clock synchronization process.

Afterwards, at time Tn, the first processing module initiates "assert trigger" to the second processing module again. In this case, the first processing module records the current count value of the first timer as the first count value when sending the trigger signal (at time Tn) and stores it in the first register, and when receiving the trigger signal (at time Tn'), the second processing module records the current count value of the second timer as the second count value and stores it in the second register. Moreover, the trigger signal also triggers interrupts of the first processing module and the second processing module.

Then, at time Tn+1, the first processing module reads a value of the second register in the second processing module to obtain the second count value, and at time Tn+1', the second processing module reads a value of the first register in the first processing module to obtain the first count value. Afterwards, the first processing module and the second processing module compare the recorded count values and the read count values, and if the recorded count value is smaller than the read count value, clock compensation is executed, otherwise, clock compensation is not executed. The specific process is similar to that at time T0, which will not be repeated here.

For example, a difference between time Tn and time T0 can be determined according to the type of clock source and the clock frequency deviation between the first clock source and the second clock source.

In the above embodiment, because the clock sources are non-homologous, a phase difference and a clock frequency deviation exist between the first processing module and the second processing module, and the phase difference and the clock frequency deviation may drift with time, so it is necessary to perform clock synchronization periodically, including obtaining the first count value and the second count value through the same trigger signal, and performing clock compensation according to the first count value and the second count value. This implementation is simple and effective, eliminating synchronization failure, significantly reducing the number of clock synchronization phases, greatly reducing the number of communication rounds between the first processing module and the second processing module, and also reducing the number of communication ports used for clock synchronization. This reduces the impact of clock jitter and delay on interconnect cables or on-chip networks, improving the accuracy of clock synchronization.

For example, when the trigger signal is sent from the first processing module to the second processing module, it needs to be transmitted through a communication bus between the modules, such as a printed circuit board (PCB) or a substrate. The transmission speed of electrical signals in the PCB/substrate is related to the dielectric constant of materials. For example, the transmission speed of electrical signals in a glass cloth substrate (FR) is about half of the speed of light, and that in a Rogers plate is about 70% of the speed of light. Considering a transmission distance of 30 cm, the deviation caused by communication between dies is in the range of nanoseconds. This time difference (e.g., the difference between T0 and T0') is small and can be ignored for clock compensation.

For example, in some examples, it is also possible to compensate for the delay caused by the transmission of the trigger signal between the processing modules, that is, to compensate for the difference between T0 and T0'.

Figure 8B:
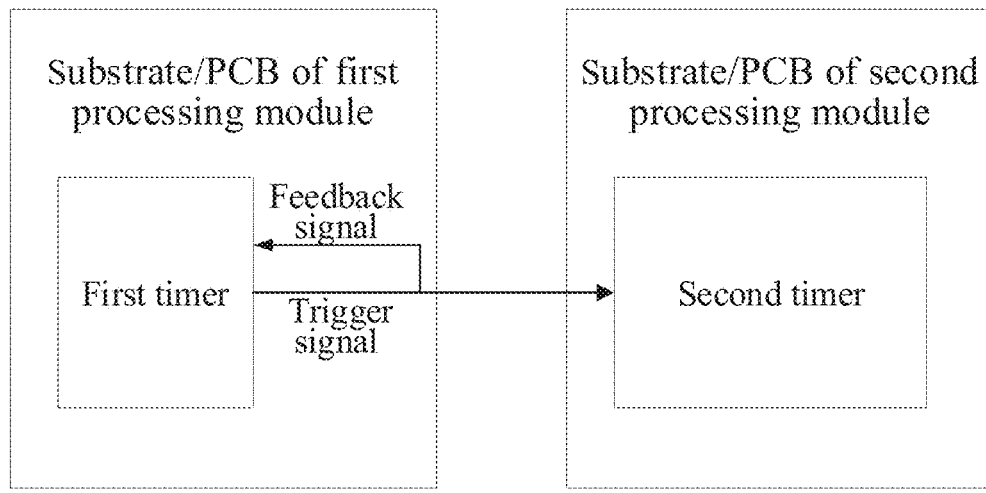
FIG. 8B is a block diagram illustrating compensation of transmission delay between processing modules according to at least one embodiment of the present disclosure.

FIG. 8B is a block diagram illustrating compensation of transmission delay between processing modules according to at least one embodiment of the present disclosure.

As illustrated in FIG. 8B, a feedback path is established for the trigger signal on a substrate or PCB of the first processing module. For example, when the trigger signal is sent from the first timer to the second timer through an on-chip network or interconnected bus, the trigger signal is transmitted back to the first timer through the feedback path, and clock compensation is performed according to the time for the trigger signal to be transmitted back to the first timer through the feedback path.

Specifically, the current count value of the first timer when the first timer receives the feedback signal transmitted through the feedback path is recorded as the first count value, and the value of the second timer when receiving the trigger signal is recorded as the second count value. Based on this, compensation of the transmission delay between the processing modules is performed.

Figure 9A:
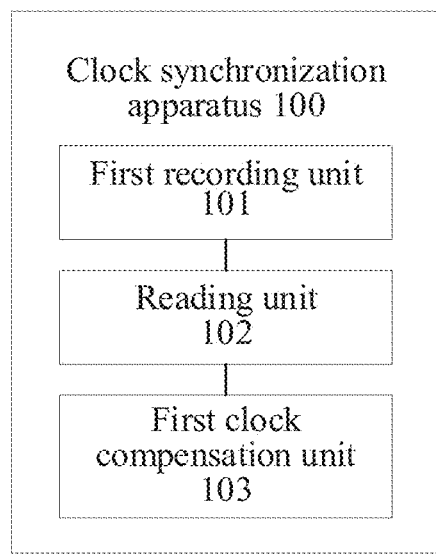
FIG. 9A is a block diagram of a clock synchronization apparatus provided by at least one embodiment of the present disclosure.

At least one embodiment of the present disclosure also provides a clock synchronization apparatus, and FIG. 9A is a block diagram of a clock synchronization apparatus provided by at least one embodiment of the present disclosure.

For example, the clock synchronization apparatus is applied to a first processing module. For example, the first processing module includes a first timer, and a count value of the first timer is used as a timing reference of the first processing module and sequentially increases.

For the description of the first processing module, the first timer, etc., please refer to the related introduction of the clock synchronization method for the first processing module mentioned earlier, which will not be repeated here.

As illustrated in FIG. 9A, the clock synchronization apparatus 100 may include a first recording unit 101 and a reading unit 102. These components are interconnected by a bus system and/or other forms of connection mechanisms (not shown). It should be noted that the components and structures of the clock synchronization apparatus 100 illustrated in FIG. 9A are only exemplary and not restrictive, and the clock synchronization apparatus 100 may have other components and structures as required.

The first recording unit 101 is configured to send a trigger signal to a second processing module while recording a current count value of a first timer at the time of sending the trigger signal as a first count value.

For example, the second processing module and a first processing module belong to different clock domains.

The reading unit 102 is configured to read a second count value from the second processing module.

For example, the second count value is a current count value of a second timer of the second processing module when the second processing module receives the trigger signal, and a count value of the second timer is used as a timing reference of the second processing module and sequentially increases.

For example, the first count value and the second count value are used for clock compensation, so that a first clock domain where the first processing module is located is synchronized with a second clock domain where the second processing module is located.

For example, as illustrated in FIG. 9A, the clock synchronization apparatus further includes a first clock compensation unit 103.

For example, in some embodiments, the first processing module includes a first phase locked loop configured to receive a first clock signal provided by a first clock source and provide a first reference clock signal for the first processing module according to the first clock signal, the second processing module includes a second phase locked loop configured to receive the first clock signal provided by the first clock source and provide a second reference clock signal for the second processing module according to the first clock signal, the first phase locked loop is different from the second phase locked loop, and the clock compensation is performed when the first processing module is in a power-on phase.

For example, in the above embodiment, the first clock compensation unit 103 is configured to perform the following operations: determining a deviation between the first count value and the second count value; and compensating the first timer based on the deviation to synchronize the first clock domain where the first processing module is located with the second clock domain where the second processing module is located.

For example, when the first clock compensation unit 103 compensates the first timer based on the deviation to synchronize the first clock domain where the first processing module is located with the second clock domain where the second processing module is located, it performs the following operations: acquiring a current count value of the first timer as a third count value; adding the deviation and the third count value to obtain an updated count value; and updating the count value of the first timer to the updated count value, so that the first clock domain where the first processing module is located is synchronized with the second clock domain where the second processing module is located.

For example, the trigger signal is further configured to trigger an interrupt of the first processing module at the same time to perform the clock compensation.

For example, in other embodiments, the first processing module is provided with a reference clock signal by a first clock source, and the second processing module is provided with a reference clock signal by a second clock source; and the first clock source and the second clock source are non-homologous clock sources, the clock synchronization is performed periodically when the first processing module is in a working state, and in the whole process of clock synchronization, the count values of the first timer and the second timer remain monotonically increasing.

In the above embodiment, the first clock compensation unit 103 is configured to perform the following operations: comparing the first count value with the second count value; and in response to the first count value being smaller than the second count value, performing clock compensation according to a deviation between the first count value and the second count value, so that the first clock domain where the first processing module is located is synchronized with the second clock domain where the second processing module is located.

For example, in the above embodiment, when the first clock compensation unit 103 performs clock compensation according to a deviation between the first count value and the second count value, so that the first clock domain where the first processing module is located is synchronized with the second clock domain where the second processing module is located, it performs the following operations: determining a deviation between the first count value and the second count value; and compensating the first timer based on the deviation to synchronize the first clock domain where the first processing module is located with the second clock domain where the second processing module is located.

For example, in the above embodiment, the first clock compensation unit 103, in response to the first clock source being capable of adjusting an oscillation frequency by voltage, compensating the first timer based on the deviation to synchronize the first clock domain where the first processing module is located with the second clock domain where the second processing module is located includes the following steps: compensating the first timer according to the deviation; determining a regulation voltage according to the deviation; and compensating the first clock source according to the regulation voltage, so that the first clock domain where the first processing module is located is synchronized with the second clock domain where the second processing module is located.

For example, in some examples, when the first clock compensation unit 103 determines the regulation voltage according to the deviation, it performs the following operations: calculating a unit time frequency deviation between the first clock source and the second clock source according to the deviation; and determining the regulation voltage according to the unit time frequency deviation.

For example, in some other examples, when the first clock compensation unit 103 determines the regulation voltage according to the deviation, it performs the following operations: obtaining a historical frequency deviation, the historical frequency deviation is the most recent unit time frequency deviation used to calculate the regulation voltage; calculating a weighted sum of the historical frequency deviation and the unit time frequency deviation calculated based on the deviation; and determining the regulation voltage according to a calculation result of the weighted sum.

For example, when the first clock compensation unit 103 compensates the first clock source according to the regulation voltage, so that the first clock domain where the first processing module is located is synchronized with the second clock domain where the second processing module is located, it performs the following operations: inputting the regulation voltage into a voltage control pin of the first clock source, so that an oscillation frequency of the first clock source converges towards an oscillation frequency of the second clock source, and the first clock source and the second clock source are synchronized.

For example, in the above embodiment, the trigger signal is also configured to trigger interrupts of the first processing module and the second processing module at the same time to perform clock compensation.

For example, the first count value is stored in a register of the first processing module, and the second count value is stored in a register of the second processing module. For the detailed description of the first recording unit 101, the reading unit 102 and the first clock compensation unit 103, please refer to the above description of the related steps of the clock synchronization method for the first processing module, which will not be repeated here.

For example, the clock synchronization apparatus 100 can achieve a technical effect similar to that of the clock synchronization method for the first processing module mentioned earlier, which will not be repeated here.

Figure 9B:
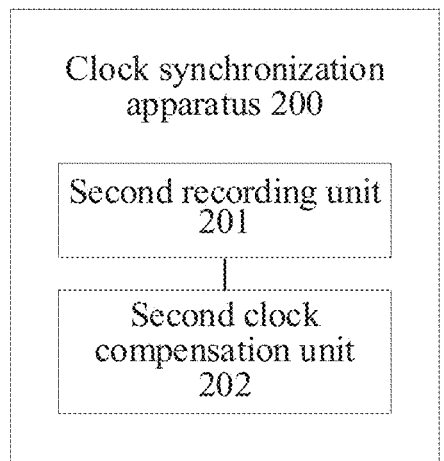
FIG. 9B is a block diagram of another clock synchronization apparatus provided by at least one embodiment of the present disclosure.

At least one embodiment of the present disclosure also provides another clock synchronization apparatus, and FIG. 9B is a block diagram of another clock synchronization apparatus provided by at least one embodiment of the present disclosure.

For example, the clock synchronization apparatus is applied to a second processing module. For example, the second processing module includes a second timer, and a count value of the second timer is used as a timing reference of the second processing module and sequentially increases.

For the description of the second processing module, the second timer, etc., please refer to the related introduction of the clock synchronization method for the second processing module mentioned earlier, which will not be repeated here.

As illustrated in FIG. 9B, the clock synchronization apparatus 200 may include a second recording unit 201. These components are interconnected by a bus system and/or other forms of connection mechanisms (not shown). It should be noted that the components and structures of the clock synchronization apparatus 200 illustrated in FIG. 9B are only exemplary and not restrictive, and the clock synchronization apparatus 200 may have other components and structures as required.

For example, the second recording unit 201 is configured to, in response to receiving a trigger signal sent by a first processing module, record a current count value of the second timer as a second count value, and the second processing module and the first processing module belong to different clock domains.

For example, the second count value is used for clock compensation in combination with a first count value, so that a first clock domain where the first processing module is located is synchronized with a second clock domain where the second processing module is located, the first count value is a current count value of a first timer of the first processing module when the first processing module sends the trigger signal to the second processing module, and a count value of the first timer is used as a timing reference of the first processing module and sequentially increases.

As illustrated in FIG. 9B, the clock synchronization apparatus 200 may further include a second clock compensation unit 202.

For example, in some embodiments, the first processing module is provided with a reference clock signal by a first clock source, and the second processing module is provided with a reference clock signal by a second clock source; and the first clock source and the second clock source are non-homologous clock sources, the clock synchronization is performed periodically when the first processing module is in a working state, and in the whole process of clock synchronization, the count values of the first timer and the second timer remain monotonically increasing.

In the above embodiment, the second clock compensation unit 202 is configured to perform the following operations: reading the first count value from the first processing module; comparing the first count value with the second count value; and in response to the second count value being smaller than the first count value, performing the clock compensation according to a deviation between the first count value and the second count value, so that the first clock domain where the first processing module is located is synchronized with the second clock domain where the second processing module is located.

For example, when the second clock compensation unit 202 performs the clock compensation according to a deviation between the first count value and the second count value, so that the first clock domain where the first processing module is located is synchronized with the second clock domain where the second processing module is located, it performs the following operations: determining a deviation between the first count value and the second count value; and compensating the second timer based on the deviation to synchronize the first clock domain where the first processing module is located with the second clock domain where the second processing module is located.

For example, the second clock compensation unit 202, in response to the second clock source being capable of adjusting the oscillation frequency by voltage, compensating the second timer based on the deviation to synchronize the first clock domain where the first processing module is located with the second clock domain where the second processing module is located includes the following steps: compensating the second timer according to the deviation; determining a regulation voltage according to the deviation; and compensating the second clock source according to the regulation voltage, so that the first clock domain where the first processing module is located is synchronized with the second clock domain where the second processing module is located.

For example, when the second clock compensation unit 202 compensates the second clock source according to the regulation voltage, so that the first clock domain where the first processing module is located is synchronized with the second clock domain where the second processing module is located, it performs the following operations: inputting the regulation voltage into a voltage control pin of the second clock source, so that an oscillation frequency of the second clock source converges towards an oscillation frequency of the first clock source, and the first clock source and the second clock source are synchronized.

For the detailed description of the second recording unit 201 and the second clock compensation unit 202, please refer to the above description of the related steps of the clock synchronization method for the second processing module, which will not be repeated here.

For example, the clock synchronization apparatus 200 can achieve a technical effect similar to that of the clock synchronization method for the second processing module mentioned earlier, which will no be repeated here.

Figure 9C:
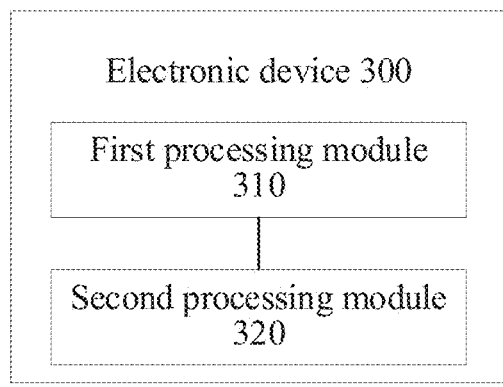
FIG. 9C is a block diagram of an electronic device provided by at least one embodiment of the present disclosure.

At least one embodiment of the present disclosure also provides an electronic device, and FIG. 9C is a structural diagram of an electronic device provided by at least one embodiment of the present disclosure.

As illustrated in FIG. 9C, the electronic device 300 includes a first processing module 310 and a second processing module 320.

For example, the first processing module includes a first timer, and a count value of the first timer is used as a timing reference of the first processing module and sequentially increases. The second processing module includes a second timer, and a count value of the second timer is used as a timing reference of the second processing module and sequentially increases. The first processing module and the second processing module belong to different clock domains.

For example, the first processing module is configured to send a trigger signal to the second processing module while recording a current count value of the first timer at the time of sending the trigger signal as a first count.

For example, the second processing module is configured to record a current count value of the second timer at the time of receiving the trigger signal as a second count value.

For example, the first count value and the second count value are used for clock compensation, so that a first clock domain where the first processing module is located is synchronized with a second clock domain where the second processing module is located.

For example, the electronic device can be a processing device such as a CPU, and the first processing module and the second processing module can be a CPU die or a CPU socket. Of course, the present disclosure is not limited to this. It should be noted that the components and structures of the clock synchronization apparatus 300 illustrated in FIG. 9C are only exemplary, not restrictive, and the clock synchronization apparatus 300 may have other components and structures as required.

For example, for the specific process of clock synchronization performed by the first processing module and the second processing module, please refer to the relevant description of the above-mentioned system clock synchronization method, which will not be repeated here.

For example, the electronic device 300 can achieve a technical effect similar to that of the aforementioned system clock synchronization method, which will not be repeated here.

Figure 10:
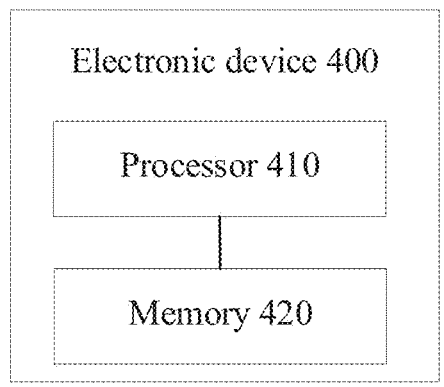
FIG. 10 is a block diagram of an electronic device provided by at least one embodiment of the present disclosure.

Some embodiments of the present disclosure also provide an electronic device. FIG. 10 is a block diagram of an electronic device provided by at least one embodiment of the present disclosure.

For example, as illustrated in FIG. 10, the electronic device 400 includes a processor 410 and a memory 420. It should be noted that the components of the electronic device 400 illustrated in FIG. 10 are only exemplary, not restrictive, and the electronic device 400 may also have other components according to actual application requirements.

For example, the processor 410 and the memory 420 can communicate with each other directly or indirectly.

For example, the processor 410 and the memory 420 may communicate through a network. The network may be a wireless network, a wired network, and/or any combination of wireless and wired networks. The processor 410 and the memory 420 can also communicate with each other through a system bus, which is not limited by the present disclosure.

For example, in some embodiments, the memory 420 is used to store computer-readable instructions in a non-transitory manner. The processor 410 is used to execute the computer-readable instructions. The computer-readable instructions, when executed by the processor 410, realize the clock synchronization method according to any of the above embodiments or the system clock synchronization method according to any of the above embodiments. For the specific implementation and related explanations of each step of the clock synchronization method, please refer to the above-mentioned embodiments of the clock synchronization method, and for the specific implementation and related explanations of each step of the system clock synchronization method, please refer to the above-mentioned embodiments of the system clock synchronization method, which will not be repeated here.

For example, the processor 410 can control other components in the electronic device 400 to perform desired functions. The processor 410 may be a central processing unit (CPU), a graphics processing unit (GPU), a network processor (NP), etc. It can also be a digital signal processor (DSP), an application specific integrated circuit (ASIC), a field programmable gate array (FPGA) or other programmable logic devices, discrete gate or transistor logic devices, and discrete hardware components. The CPU can be of X86 or ARM architecture.

For example, the memory 420 may include any combination of one or more computer program products, and the computer program product may be various forms of computer-readable storage media, such as volatile memory and/or nonvolatile memory. The volatile memory may be, for example, a random access memory (RAM) and/or a cache, etc. The nonvolatile memory may be, for example, a read-only memory (ROM), a hard disk, an erasable programmable read-only memory (EPROM), a portable compact disk read-only memory (CD-ROM), a USB memory, a flash memory, etc. One or more computer-readable instructions can be stored on the computer-readable storage medium, and the processor 410 can execute the computer-readable instructions to realize various functions of the electronic device 400. Various applications and data can also be stored in the storage medium.

For example, in some embodiments, the electronic device 400 may be a mobile phone, a tablet computer, electronic paper, a television, a display, a notebook computer, a digital photo frame, a navigator, a wearable electronic device, a smart home device, and the like.

For example, the electronic device 400 may include a display panel, which may be used to display interactive content and the like. For example, the display panel can be a rectangular panel, a circular panel, an oval panel or a polygonal panel. In addition, the display panel can be not only a flat panel, but also a curved panel or even a spherical panel.

For example, the electronic device 400 can have a touch control function, that is, the electronic device 400 can be a touch device.

For example, for the detailed description of the process of executing the clock synchronization method by the electronic device 400, please refer to the relevant description in the embodiments of the clock synchronization method, and for the detailed description of the process of executing the system clock synchronization method by the electronic device 400, please refer to the relevant description in the embodiments of the above-mentioned system clock synchronization method, which will not be repeated here.

Figure 11:
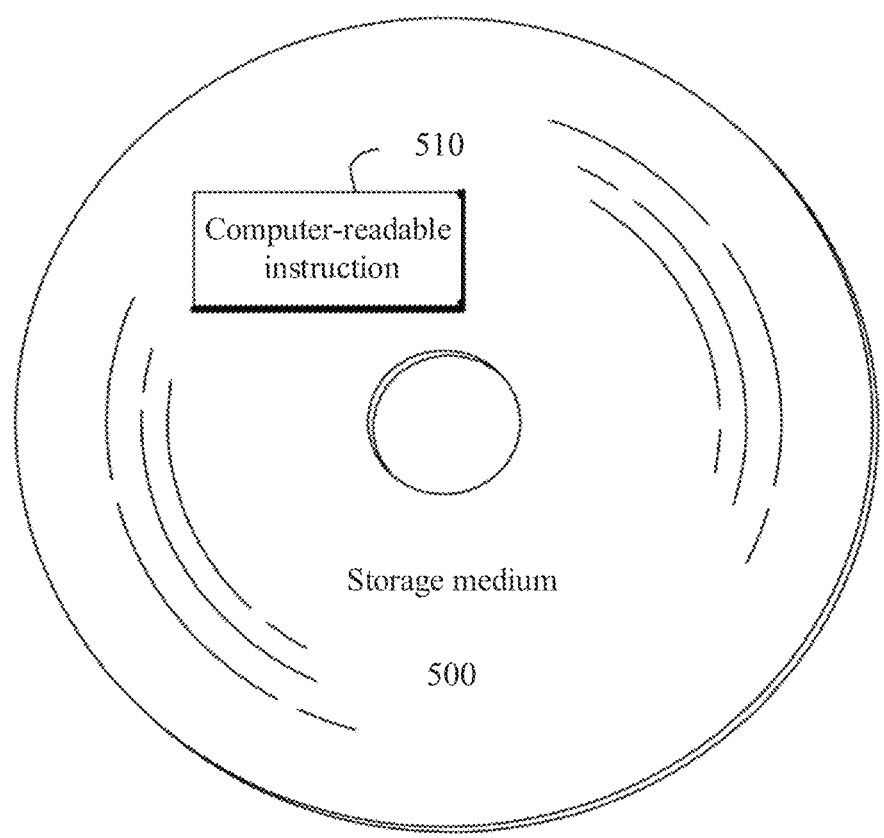
FIG. 11 is a diagram of a non-transitory computer-readable storage medium provided by at least one embodiment of the present disclosure.

FIG. 11 is a diagram of a non-transitory computer-readable storage medium provided by at least one embodiment of the present disclosure. For example, as illustrated in FIG. 11, one or more computer-readable instructions 510 may be stored on a storage medium 500 in a non-transitory manner. For example, one or more steps in the clock synchronization method described above may be executed when the computer-readable instructions 510 are executed by a processor, or one or more steps in the system clock synchronization method described above may be executed when the computer-readable instructions 510 are executed by a processor.

For example, the storage medium 500 can be applied to the electronic device 400. For example, the storage medium 500 may include the memory 420 in the electronic device 400.

For example, for the description of the storage medium 500, please refer to the description of the memory 420 in the embodiment of the electronic device 400, which will not be repeated here.

In particular, according to the embodiment of the present disclosure, the process described above with reference to the flowchart can be implemented as a computer software program. For example, an embodiment of the present disclosure provides a computer program product, which includes a computer program stored on a non-transitory computer-readable medium, and the computer program contains a program code for executing the method illustrated in the flowchart. In such an embodiment, the computer program can be downloaded and installed from the network through the communication apparatus, or installed from the storage apparatus, or installed from the ROM. When the computer program is executed by the processing apparatus, the above functions defined in the method of the embodiment of the present disclosure are performed.

It should be noted that in the context of the present disclosure, a computer-readable medium may be a tangible medium, which may contain or store a program for use by or in combination with an instruction execution system, apparatus or device. The computer-readable medium may be a computer-readable signal medium or a computer-readable storage medium or any combination of the two. The computer-readable storage medium may be, for example, but not limited to: an electrical, magnetic, optical, electromagnetic, infrared, or semiconductor system, apparatus or device, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium containing or storing a program, which can be used by or in combination with an instruction execution system, apparatus or device. In the present disclosure, the computer-readable signal medium may include a data signal propagated in a baseband or as part of a carrier wave, in which computer-readable program codes are carried. The propagated data signal can take many forms, including but not limited to electromagnetic signals, optical signals or any suitable combination of the above. The computer-readable signal medium may also be any computer-readable medium other than the computer-readable storage medium, which can send, propagate or transmit a program for use by or in connection with an instruction execution system, apparatus or device. The program code contained in the computer-readable medium can be transmitted by any suitable medium, including but not limited to: wires, optical cables, radio frequency (RF) and the like, or any suitable combination of the above.

The computer-readable medium may be included in the electronic device; or it can exist alone without being assembled into the electronic device.

Computer program codes for performing the operations of the present disclosure can be written by one or more programming languages or combinations thereof, including but not limited to object-oriented programming languages such as Java, Smalltalk and C++, and conventional procedural programming languages such as "C" language or similar programming languages. The program code can be completely executed on subscriber computers, partially executed on subscriber computers, executed as an independent software package, partially executed on subscriber computers and partially executed on remote computers, or completely executed on remote computers or servers. In a case involving remote computers, the remote computers may be connected to subscriber computers through any kind of network including a local area network (LAN) or a wide area network (WAN), or may be connected to external computers (e.g., connected through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code that contains one or more executable instructions for implementing specified logical functions. It should also be noted that in some alternative implementations, the functions noted in the blocks may occur in a different order than those noted in the drawings. For example, two blocks illustrated in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The units involved in the embodiments of the present disclosure can be realized by software or hardware. In certain cases, the name of a unit does not constitute a limitation on the unit itself.

The functions described above can be at least partially performed by one or more hardware logic components. For example, without limitation, exemplary hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

According to one or more embodiments of the present disclosure, a clock synchronization method is provided; a first processing module includes a first timer, and a count value of the first timer is used as a timing reference of the first processing module and sequentially increases; and the clock synchronization method includes: sending a trigger signal to a second processing module while recording a current count value of the first timer at the time of sending the trigger signal as a first count value, the second processing module and the first processing module belonging to different clock domains; and reading a second count value from the second processing module, the second count value being a current count value of a second timer of the second processing module when the second processing module receives the trigger signal, and a count value of the second timer being used as a timing reference of the second processing module and sequentially increasing; the first count value and the second count value are used for clock compensation, so that a first clock domain where the first processing module is located is synchronized with a second clock domain where the second processing module is located.

According to one or more embodiments of the present disclosure, the first processing module includes a first phase locked loop configured to receive a first clock signal provided by a first clock source and provide a first reference clock signal for the first processing module according to the first clock signal, the second processing module includes a second phase locked loop configured to receive the first clock signal provided by the first clock source and provide a second reference clock signal for the second processing module according to the first clock signal, the first phase locked loop is different from the second phase locked loop, and the clock compensation is performed when the first processing module is in a power-on phase.

According to one or more embodiments of the present disclosure, the clock synchronization method further includes: determining a deviation between the first count value and the second count value; and compensating the first timer based on the deviation to synchronize the first clock domain where the first processing module is located with the second clock domain where the second processing module is located.

According to one or more embodiments of the present disclosure, compensating the first timer based on the deviation to synchronize the first clock domain where the first processing module is located with the second clock domain where the second processing module is located includes: acquiring a current count value of the first timer as a third count value; adding the deviation and the third count value to obtain an updated count value; and updating the count value of the first timer to the updated count value, so that the first clock domain where the first processing module is located is synchronized with the second clock domain where the second processing module is located.

According to one or more embodiments of the present disclosure, the trigger signal is further configured to simultaneously trigger an interrupt of the first processing module to perform the clock compensation.

According to one or more embodiments of the present disclosure, the first processing module is provided with a reference clock signal by a first clock source, and the second processing module is provided with a reference clock signal by a second clock source; and the first clock source and the second clock source are non-homologous clock sources, the clock synchronization is performed periodically when the first processing module is in a working state, and in the whole process of clock synchronization, the count values of the first timer and the second timer always maintain a monotonically increasing pattern.

According to one or more embodiments of the present disclosure, the clock synchronization method further includes: comparing the first count value with the second count value; and in response to the first count value being smaller than the second count value, performing clock compensation according to a deviation between the first count value and the second count value, so that the first clock domain where the first processing module is located is synchronized with the second clock domain where the second processing module is located.

According to one or more embodiments of the present disclosure, performing clock compensation according to a deviation between the first count value and the second count value, so that the first clock domain where the first processing module is located is synchronized with the second clock domain where the second processing module is located, includes: determining a deviation between the first count value and the second count value; and compensating the first timer based on the deviation to synchronize the first clock domain where the first processing module is located with the second clock domain where the second processing module is located.

According to one or more embodiments of the present disclosure, in response to the first clock source being capable of adjusting the oscillation frequency by voltage, compensating the first timer based on the deviation to synchronize the first clock domain where the first processing module is located with the second clock domain where the second processing module is located includes: compensating the first timer according to the deviation; determining a regulation voltage according to the deviation; and compensating the first clock source according to the regulation voltage, so that the first clock domain where the first processing module is located is synchronized with the second clock domain where the second processing module is located.

According to one or more embodiments of the present disclosure, determining the regulation voltage according to the deviation includes: calculating a unit time frequency deviation between the first clock source and the second clock source according to the deviation; and determining the regulation voltage according to the unit time frequency deviation.

According to one or more embodiments of the present disclosure, determining the regulation voltage according to the deviation includes: obtaining a historical frequency deviation, the historical frequency deviation is the most recent unit time frequency deviation used to calculate the regulation voltage; calculating a weighted sum of the historical frequency deviation and the unit time frequency deviation calculated based on the deviation; and determining the regulation voltage according to a calculation result of the weighted sum.

According to one or more embodiments of the present disclosure, compensating the first clock source according to the regulation voltage, so that the first clock domain where the first processing module is located is synchronized with the second clock domain where the second processing module is located, includes: inputting the regulation voltage into a voltage control pin of the first clock source, so that an oscillation frequency of the first clock source converges towards an oscillation frequency of the second clock source, and the first clock source and the second clock source are synchronized.

According to one or more embodiments of the present disclosure, the trigger signal is further configured to simultaneously trigger interrupts of the first processing module and the second processing module to perform the clock compensation.

According to one or more embodiments of the present disclosure, the first count value is stored in a register of the first processing module, and the second count value is stored in a register of the second processing module.

According to one or more embodiments of the present disclosure, a clock synchronization method for a second processing module is provided; the second processing module includes a second timer, and a count value of the second timer is used as a timing reference of the second processing module and sequentially increases; and the clock synchronization method includes: in response to receiving a trigger signal sent by a first processing module, recording a current count value of the second timer as a second count value, the second processing module and the first processing module belonging to different clock domains; the second count value is used for clock compensation in combination with a first count value, so that a first clock domain where the first processing module is located is synchronized with a second clock domain where the second processing module is located, the first count value is a current count value of a first timer of the first processing module when the first processing module sends the trigger signal to the second processing module, and a count value of the first timer is used as a timing reference of the first processing module and sequentially increases.

According to one or more embodiments of the present disclosure, the first processing module is provided with a reference clock signal by a first clock source, and the second processing module is provided with a reference clock signal by a second clock source; and the first clock source and the second clock source are non-homologous clock sources, the clock synchronization is performed periodically when the first processing module is in a working state, and in the whole process of clock synchronization, the count values of the first timer and the second timer remain monotonically increasing.

According to one or more embodiments of the present disclosure, the clock synchronization method further includes: reading the first count value from the first processing module; comparing the first count value with the second count value; and in response to the second count value being smaller than the first count value, performing the clock compensation according to a deviation between the first count value and the second count value, so that the first clock domain where the first processing module is located is synchronized with the second clock domain where the second processing module is located.

According to one or more embodiments of the present disclosure, performing the clock compensation according to a deviation between the first count value and the second count value, so that the first clock domain where the first processing module is located is synchronized with the second clock domain where the second processing module is located, includes: determining a deviation between the first count value and the second count value; and compensating the second timer based on the deviation to synchronize the first clock domain where the first processing module is located with the second clock domain where the second processing module is located.

According to one or more embodiments of the present disclosure, in response to the second clock source being capable of adjusting the oscillation frequency by voltage, compensating the second timer based on the deviation to synchronize the first clock domain where the first processing module is located with the second clock domain where the second processing module is located includes: compensating the second timer according to the deviation; determining a regulation voltage according to the deviation; and compensating the second clock source according to the regulation voltage, so that the first clock domain where the first processing module is located is synchronized with the second clock domain where the second processing module is located.

According to one or more embodiments of the present disclosure, compensating the second clock source according to the regulation voltage, so that the first clock domain where the first processing module is located is synchronized with the second clock domain where the second processing module is located, includes: inputting the regulation voltage into a voltage control pin of the second clock source, so that an oscillation frequency of the second clock source converges towards an oscillation frequency of the first clock source, and the first clock source and the second clock source are synchronized.

According to one or more embodiments of the present disclosure, a system clock synchronization method is provided; a system includes a first processing module and a second processing module, the first processing module includes a first timer, a count value of the first timer is used as a timing reference of the first processing module and sequentially increases, the second processing module includes a second timer, a count value of the second timer is used as a timing reference of the second processing module and sequentially increases, the first processing module and the second processing module belong to different clock domains, and the system clock synchronization method includes: sending, by the first processing module, a trigger signal to the second processing module, recording, by the first processing module, a current count value of the first timer at the time of sending the trigger signal as a first count value, and recording, by the second processing module, a current count value of the second timer at the time of receiving the trigger signal as a second count value; the first count value and the second count value are used for clock compensation, so that a first clock domain where the first processing module is located is synchronized with a second clock domain where the second processing module is located.

According to one or more embodiments of the present disclosure, a clock synchronization apparatus for a first processing module is provided; the first processing module includes a first timer, and a count value of the first timer is used as a timing reference of the first processing module and sequentially increases; and the clock synchronization apparatus includes: a first recording unit configured to send a trigger signal to a second processing module while recording a current count value of the first timer at the time of sending the trigger signal as a first count value, the second processing module and the first processing module belonging to different clock domains; and a reading unit configured to read a second count value from the second processing module, the second count value being a current count value of a second timer of the second processing module when the second processing module receives the trigger signal, and a count value of the second timer being used as a timing reference of the second processing module and sequentially increasing; the first count value and the second count value are used for clock compensation, so that a first clock domain where the first processing module is located is synchronized with a second clock domain where the second processing module is located.

According to one or more embodiments of the present disclosure, a clock synchronization apparatus for a second processing module is provided; the second processing module includes a second timer, and a count value of the second timer is used as a timing reference of the second processing module and sequentially increases; and the clock synchronization apparatus includes: a second recording unit configured to, in response to receiving a trigger signal sent by a first processing module, record a current count value of the second timer as a second count value, the second processing module and the first processing module belonging to different clock domains; the second count value is used for clock compensation in combination with a first count value, so that a first clock domain where the first processing module is located is synchronized with a second clock domain where the second processing module is located, the first count value is a current count value of a first timer of the first processing module when the first processing module sends the trigger signal to the second processing module, and a count value of the first timer is used as a timing reference of the first processing module and sequentially increases.

According to one or more embodiments of the present disclosure, an electronic device is provided, including a first processing module and a second processing module; the first processing module includes a first timer, a count value of the first timer is used as a timing reference of the first processing module and sequentially increases, the second processing module includes a second timer, a count value of the second timer is used as a timing reference of the second processing module and sequentially increases, and the first processing module and the second processing module belong to different clock domains; the first processing module is configured to send a trigger signal to the second processing module while recording a current count value of the first timer at the time of sending the trigger signal as a first count value, and the second processing module is configured to record a current count value of the second timer at the time of receiving the trigger signal as a second count value; the first count value and the second count value are used for clock compensation, so that a first clock domain where the first processing module is located is synchronized with a second clock domain where the second processing module is located.

According to one or more embodiments of the present disclosure, an electronic device is provided, including a memory in which computer-executable instructions are stored in a non-transitory manner, and a processor configured to execute the computer-executable instructions, the computer-executable instructions, when executed by the processor, realize the clock synchronization method according to any embodiment of the present disclosure or the system clock synchronization method according to any embodiment of the present disclosure.

According to one or more embodiments of the present disclosure, a non-transitory computer-readable storage medium is provided, the non-transitory computer-readable storage medium stores computer-executable instructions which, when executed by a processor, realize the clock synchronization method according to any embodiment of the present disclosure or the system clock synchronization method according to any embodiment of the present disclosure.

The above are only preferred embodiments of the present disclosure and the explanation of the applied technical principles. It should be understood by those skilled in the art that the present disclosure scope involved in the present disclosure is not limited to the technical solution formed by the specific combination of the above technical features, but also covers other technical solutions formed by any combination of the above technical features or their equivalent features without departing from the above disclosure concept, such as a technical solution formed by mutual replacement of the above-mentioned features and technical features with similar functions disclosed in the present disclosure (but not limited thereto).

Further, although the operations are depicted in a particular order, this should not be understood as requiring that these operations be performed in the particular order illustrated or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological actions, it should be understood that the subject matter defined in the appended claims is not necessarily limited to the specific features or actions described above. On the contrary, the specific features and actions described above are only exemplary forms of implementing the claims.

For the present disclosure, the following points need to be clarified.
   (1) The drawings of an embodiment of the present disclosure only relates to the structure related to the embodiment of the present disclosure, and other structures can refer to the general design.
   (2) In case of no conflict, the embodiments of the present disclosure and the features in the embodiments can be combined with each other to obtain a new embodiment.

The above content only specifies the specific implementation of the present disclosure, but the protection scope of the present disclosure is not limited to this. The protection scope of the present disclosure shall be subject to the protection scope of the claims.

What is claimed is:

1. A clock synchronization method for synchronizing a first clock domain with a second clock domain, the clock synchronization method comprising:
   sending a trigger signal by a first processing module located in the first clock domain to a second processing module located in the second clock domain, wherein the first processing module comprises a first timer, wherein the second processing module comprises a second timer, and wherein the first clock domain is different than the second clock domain;
   recording a current count value of the first timer as a first count value in a first register located in the first processing module, wherein the current count value of the first timer indicates a value of the first timer when the trigger signal is sent to the second processing module;
   reading, by the first processing module, a second count value from a second register located in the second processing module, wherein the second count value is a current count value of the second timer stored in the second register based on the second processing module receiving the trigger signal; and
   synchronizing the first clock domain with the second clock domain based on the first count value and the second count value.

2. The clock synchronization method according to claim 1, wherein the first processing module is configured to receive a first clock signal provided by a first clock source and provide a first reference clock signal for the first processing module according to the first clock signal, and wherein
the second processing module further is configured to receive the first clock signal provided by the first clock source and provide a second reference clock signal for the second processing module according to the first clock signal, and
the clock compensation is performed upon the first processing module being in a power-on phase.

3. The clock synchronization method according to claim 2, wherein the clock synchronization method further comprises:
determining a deviation between the first count value and the second count value; and
compensating the first timer based on the deviation to synchronize the first clock domain where the first processing module is located with the second clock domain where the second processing module is located.

4. The clock synchronization method according to claim 3, wherein the compensating the first timer based on the deviation to synchronize the first clock domain where the first processing module is located with the second clock domain where the second processing module is located comprises:
acquiring a current count value of the first timer as a third count value;
adding the deviation and the third count value to obtain an updated count value; and
updating the count value of the first timer to the updated count value to synchronize the first clock domain where the first processing module is located with the second clock domain where the second processing module is located.

5. The clock synchronization method according to claim 1, wherein the first processing module is provided with a reference clock signal by a first clock source, and the second processing module is provided with a reference clock signal by a second clock source; and
the first clock source and the second clock source are non-homologous clock sources,
the clock synchronization is performed periodically upon the first processing module being in a working state, and
in a whole process of the clock synchronization, the count value of the first timer and the count value of the second timer remain monotonically increasing.

6. The clock synchronization method according to claim 5, wherein the clock synchronization method further comprises:
comparing a magnitude relationship between the first count value and the second count value; and
in response to the first count value being smaller than the second count value, performing the clock compensation according to a deviation between the first count value and the second count value to synchronize the first clock domain where the first processing module is located with the second clock domain where the second processing module is located.

7. The clock synchronization method according to claim 6, wherein the performing the clock compensation according to a deviation between the first count value and the second count value to synchronize the first clock domain where the first processing module is located with the second clock domain where the second processing module is located, comprises:
determining the deviation between the first count value and the second count value; and
compensating the first timer based on the deviation to synchronize the first clock domain where the first processing module is located with the second clock domain where the second processing module is located.

8. The clock synchronization method according to claim 7, wherein in response to the first clock source being capable of adjusting an oscillation frequency by voltage,
the compensating the first timer based on the deviation to synchronize the first clock domain where the first processing module is located with the second clock domain where the second processing module is located, comprises:
compensating the first timer according to the deviation;
determining a regulation voltage according to the deviation; and
compensating the first clock source according to the regulation voltage to synchronize the first clock domain where the first processing module is located with the second clock domain where the second processing module is located.

9. The clock synchronization method according to claim 8, wherein the compensating the first clock source according to the regulation voltage to synchronize the first clock domain where the first processing module is located with the second clock domain where the second processing module is located, comprises:
inputting the regulation voltage into a voltage control pin of the first clock source, so that an oscillation frequency of the first clock source converges towards an oscillation frequency of the second clock source, and the first clock source and the second clock source are synchronized.

10. A clock synchronization method applicable for synchronizing a first clock domain with a second clock domain, the clock synchronization method comprising:
receiving, by a second processing module located in the second clock domain, a trigger signal sent by a first processing module located in the first clock domain, wherein the first processing module comprises a first timer, wherein the second processing module comprises a second timer, and wherein the first clock domain is different than the second clock domain, wherein a current count value of the first timer is recorded by the first processing module as a first count value in a first register located in the first processing module, and wherein the current count value of the first timer indicates a value of the first timer when the trigger signal is sent to the second processing module;
in response to receiving the trigger signal sent by the first processing module, recording a current count value of the second timer as a second count value in a second register located in the second processing module, wherein the first processing module is configured to read the second count value from the second register located in the second processing module,
wherein the first processing module is configured to synchronize the first clock domain with the second clock domain based on the second count value and the first count value.

11. The clock synchronization method according to claim 10, wherein the first processing module is provided with a reference clock signal by a first clock source, and the second processing module is provided with a reference clock signal by a second clock source; and the first clock source and the second clock source are non-homologous clock sources, the clock synchronization is performed periodically upon the first processing module being in a working state, and in a whole process of the clock synchronization, the count value of the first timer and the count value of the second timer remain monotonically increasing.

12. The clock synchronization method according to claim 11, wherein the clock synchronization method further comprises:

reading the first count value from the first processing module;

comparing a magnitude relationship between the first count value and the second count value; and in response to the second count value being smaller than the first count value, performing the clock compensation according to a deviation between the first count value and the second count value to synchronize the first clock domain where the first processing module is located with the second clock domain where the second processing module is located.

13. The clock synchronization method according to claim 12, wherein the performing the clock compensation according to a deviation between the first count value and the second count value to synchronize the first clock domain where the first processing module is located with the second clock domain where the second processing module is located, comprises:

determining the deviation between the first count value and the second count value; and compensating the second timer based on the deviation to synchronize the first clock domain where the first processing module is located with the second clock domain where the second processing module is located.

14. The clock synchronization method according to claim 13, wherein in response to the second clock source being capable of adjusting an oscillation frequency by voltage, the compensating the second timer based on the deviation to synchronize the first clock domain where the first processing module is located with the second clock domain where the second processing module is located comprises:

compensating the second timer according to the deviation;

determining a regulation voltage according to the deviation; and compensating the second clock source according to the regulation voltage to synchronize the first clock domain where the first processing module is located with the second clock domain where the second processing module is located.

15. A system for clock synchronization, wherein the system comprises:

a first processing module located in a first clock domain, wherein the first processing module comprises a first timer; and a second processing module located in a second clock domain, wherein the second processing module comprises a second timer, and wherein the first clock domain is different than the second clock domain;

wherein the first processing module is configured to:

send a trigger signal to the second processing module, and record, a current count value of the first timer as a first count value in a first register located in the first processing module, wherein the current count value of the first timer indicates a value of the first timer when the trigger signal is sent to the second processing module, and wherein the second processing module is configured to:

record a current count value of the second timer as a second count value in a second register located in the second processing module upon receiving the trigger signal, wherein the first count value and the second count value are used to synchronize the first clock domain with the second clock domain.

16. An electronic device, comprising:

a memory, non-transiently storing computer-executable instructions, and a processor, configured to execute the computer-executable instructions, wherein the computer-executable instructions upon being executed by the processor implement the clock synchronization method according to claim 1.

17. A non-transitory computer-readable storage medium, wherein the non-transitory computer-readable storage medium stores computer-executable instructions, the computer-executable instructions upon being executed by a processor implement the clock synchronization method according to claim 1.

* * * * *